US007565109B2

(12) United States Patent
Morioka et al.

(10) Patent No.: US 7,565,109 B2
(45) Date of Patent: Jul. 21, 2009

(54) WIRELESS COMMUNICATION SYSTEM, WIRELESS COMMUNICATION APPARATUS, WIRELESS COMMUNICATION METHOD AND COMPUTER PROGRAM

(75) Inventors: Yuichi Morioka, Kanagawa (JP); Kenzo Nishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 856 days.

(21) Appl. No.: 10/898,227

(22) Filed: Jul. 26, 2004

(65) Prior Publication Data

US 2005/0058117 A1    Mar. 17, 2005

(30) Foreign Application Priority Data

Jul. 29, 2003    (JP)    ............... 2003-281587

(51) Int. Cl.
H04B 15/00    (2006.01)
(52) U.S. Cl. .................. 455/63.1; 455/63.2; 455/67.11; 455/67.13; 455/426.1; 455/441; 455/426.2; 370/400; 370/338; 370/230.1; 370/231; 370/235
(58) Field of Classification Search ................ 455/454, 455/444, 41.2, 41.3, 67.11, 63.1, 63.2, 63.3; 370/338, 252, 216; 709/230
See application file for complete search history.

(56) References Cited

U.S. PATENT DOCUMENTS 6,628,639 B1 * 9/2003 Ishii ........................... 370/346

6,763,013 B2 * 7/2004 Kennedy ..................... 370/338
6,771,968 B1 * 8/2004 Heubel ....................... 455/454
2001/0044308 A1 * 11/2001 Klank ......................... 455/452
2002/0082035 A1 * 6/2002 Aihara et al. ............... 455/518
2003/0128690 A1   7/2003 Elliott et al.

FOREIGN PATENT DOCUMENTS

| JP | 63-232533 | 9/1988 |
| JP | 06-037762 | 2/1994 |
| JP | 7-143558  | 6/1995 |

OTHER PUBLICATIONS

International Standard ISO/IEC 8802-11:1999(E) ANSI/IEEE Std 802.11, 1999 Edition, Part 11: Wireless LAN Medium Access Control (MAC) and Physical Layer (PHY) specifications.

(Continued)

Primary Examiner—Charles N Appiah
Assistant Examiner—Randy Peaches
(74) Attorney, Agent, or Firm—Oblon, Spivak, McClelland, Maier & Neustadt, P.C.

(57) ABSTRACT

A deadlocked state in which each communication station cannot recognize mutual existence is evaded to form a self-organized distribution type multi-channel wireless network. In some interference situations, a beacon transmission channel selected on a self criterion is not always a receivable channel for all of neighbor communication stations. A communication station receiving interference from another system periodically transmits an interference annunciation signal (IAS) through all channels under no interference, and informs the neighbor stations of the existence and the channel under interference. Thereby, transmission of a beacon is restrained through the channel under interference up to a beacon-unhearable degree.

25 Claims, 19 Drawing Sheets

OTHER PUBLICATIONS

ETSI Standard ETSI TS 101 761-1 V.1.2.1 (Nov. 2000) Broadband Radio Access Networks (BRAN); Hiperlan Type 2; Data Link Control (DLC) Layer; Part 1: Basic Data Transport Functions.

ETSI TS 101 761-2 V1.1.1 (Apr. 2000) Broadband Radio Access Networks (BRAN); Hiperlan Type 2; Data Link Control (DLC) Layer; Part 2: Radio Link Control (RLC) sublayer.

International Standard ISO/IEC 8802-11:1999(E) ANSI/IEEE Std 802.11, 1999 Edition, Part 11: Wireless LAN Medium Access Control (MAC) and Physical Layer (PHY) specifications.

ETSI Standard ETSI TS 101 761-1 V.1.2.1 Broadband Radio Access Networks (Bran); Hiperlan Type 2; Data Link Control (DLC) Layer; Part 1: Basic Data Transport Functions Date is missing.

ETSI TS 101 761-2 V1.1.1 Broadband Radio Access Networks (BRAN); Hiperlan Type 2; Data Link Control (DLC) Layer; Part 2: Radio Link Control (RLC) sublayer Date is missing.

* cited by examiner

WIRELESS COMMUNICATION SYSTEM, WIRELESS COMMUNICATION APPARATUS, WIRELESS COMMUNICATION METHOD AND COMPUTER PROGRAM

CROSS REFERENCES TO RELATED APPLICATIONS

The present document is based on Japanese Priority Document JP 2003-281587, filed in the Japanese Patent Office on Jul. 29, 2003, the entire contents of which being incorporated herein by reference.

BACKGROUND OF THE INVENTION

1. Field of the Invention

The present invention relates to a wireless communication system for mutual communication among a plurality of wireless stations such as a wireless LAN (Local Area Network), a wireless communication apparatus, a wireless communication method and a computer program, and more particularly to a wireless communication system, a wireless communication apparatus, a wireless communication method and a computer program, in which a wireless network is configured by Ad-hoc communication without relationship between a controlling station and a controlled station.

2. Description of Related Art

More in detail, the present invention relates to a wireless communication system, a wireless communication apparatus, a wireless communication method and a computer program, in which a self-organized distribution type wireless network is formed in a communication environment preparing a plurality of channels, without interference between neighboring wireless systems and without relationship between a controlling station and a controlled station, and more particularly to a wireless communication system, a wireless communication apparatus, a wireless communication method and a computer program, in which each communication station suitably determines its own beacon transmission channel to form a self-organized distribution type multi-channel wireless network.

By configuring a LAN by interconnecting a plurality of computers, information such as files and data and peripheral machines such as a printer can be shared, and information exchange such as transfer of e-mails and data content can be made.

Conventionally, a wired LAN connection is generally realized by optical fibers, coaxial cables or twist pair cables. However, in this case, line laying works are necessary, it is difficult to configure a network with ease, and a cable distribution becomes complicated. The motion range of apparatuses after the LAN configuration is limited by cable lengths, which is inconvenient.

A wireless LAN has drawn attention as a system releasing a user from LAN wiring of a wired system. According to a wireless LAN, most of wired cables can be omitted in a work space such as an office so that communication terminals such as personal computers can be moved relatively easily.

In recent years, demands for a wireless LAN system are increasing considerably because of its high speed and low cost. Introduction of a personal area network (PAN) has been studied recently in order to perform information communication by configuring a small scale wireless network among a plurality of electronic machines existing about each person. Different communication systems have been stipulated by utilizing frequency bands unnecessary for licenses by supervisory offices, such as a 2.4 GHz band and a 5 GHz band.

As one of the standard specifications of wireless networks, IEEE (The Institute of Electrical and Electronics Engineers) 802.11 (e.g., refer to Non-patent Document 1), HiperLAN/2 (e.g., refer to Non-patent Document 2 or Non-patent Document 3), IEEE 802.15.3, Bluetooth communication and the like can be enumerated. The IEEE 802.11 standard has various wireless communication schemes such as the IEEE 802.11a standard and the IEEE 802.11b standard depending upon a difference of a wireless communication scheme and a frequency band in use.

In order to configure a local area network by using wireless technologies, a method is generally used by which one apparatus to be used as a control station called an "access point" or a "coordinator" is installed in an area and a network is formed under the collective control by the control station.

When information is transmitted from some communication apparatus in a wireless network having distributed access points, an access control method based on band reservation has been adopted widely by which a band necessary for transmitting the information is first reserved at an access point to use a transmission path without collision of information transmission with other communication apparatuses. Namely, synchronous wireless communication is performed by mutually synchronizing with communication apparatuses in the wireless network by distributing access points.

In a case where asynchronous communication is to be performed between communication apparatuses on the transmission side and reception side in a wireless communication system having access points, this wireless communication requires by all means wireless communication via an access point so that there arises the problem that a transmission path use efficiency is decreased.

As another method of configuring a wireless network, "Ad-hoc communication" has been devised in which terminals perform wireless communication directly and asynchronously. It can be considered that the ad hoc communication in which arbitrary terminals perform wireless communication directly without using a particular access point is suitable particularly for a small scale wireless network configured by a relatively small number of clients positioned near each other.

In a work environment in which information machines such as personal computers (PC) are prevailing and a number of apparatuses are mixedly used in an office, it can be supposed that a plurality of networks are configured in a superposed manner with scattered communication stations. In this state, if the wireless network uses a single channel, there is no room of recovering the situations that another system intrudes during communication and that the communication quality is degraded by interference or the like.

To avoid this, a conventional wireless network system generally adopts a method by which a plurality of frequency channels are prepared for coexistence of other networks and a communication operation starts by making a wireless communication apparatus serving as an access point select one frequency channel.

The multi-channel communication scheme of this type can maintain a network operation and realize coexistence of other networks by switching a frequency channel to be used, when another system intrudes during communication or a communication quality is degraded by interference or the like.

For example, a high speed PAN system of IEEE 802.15.3 also prepares a plurality of frequency channels usable by the system and adopts the algorithm that after a power is turned on, a wireless communication device selects a usable frequency channel by executing a scan operation for all usable channels in order to confirm whether or not there are devices which are transmitting a beacon signal as the Piconet Coordinator (PNC) around the wireless communication device.

In an ad hoc network of a self-organized distribution type without relationship between a controlling station and a controlled station, resource management of frequency channels is important in order to suppress as much as possible interference with nearby different wireless networks under operation. However, in order to change frequency channels used in the network at a time, a representative station called a coordinator or an access point is required to instructs a use channel to each terminal station. In other words, it is difficult to switch a frequency channel in the ad hoc network.

In HiperLAN/2, for example, a method of changing frequency channels at a time can be considered in order to selectively use a plurality of channels. For example, an AP (base station) as a central control station repetitively notifies a frequency channel change, and, at some timing, AP and an MT (mobile station) connected to AP switch the channels at a time. A judgment whether the channel is switched or not is determined initiatively by AP. Information to be used for the judgment is collected by following a process procedure.

Specifically, the process includes the following procedures: (1) upon an instruction from AP, the connected MT temporarily suspends communication, scans other frequency channels to evaluate the channel quality, and sends the results to AP; (2) upon an instruction from AP, AP temporarily stops the transmission on a broadcast channel, and the connected MT scans the frequency channel in present use, evaluates the channel quality and reports the results to AP.

Bluetooth communication adopts a method by which a central control station called a master serving as a standard performs random frequency hopping to utilize squarely each frequency channel. Existence of the central control station called the master is essential for the network configuration and the central control station is used as the standard of a frequency channel hopping pattern and synchronization of a time axis direction. If the master extinguishes, the network formed until then is once disconnected so that a process of selecting a new master is necessary.

Also in a wireless LAN system of the IEEE 802.11 series, since a network is formed by using the frequency channel initially set by an access point, it is difficult to configure an ad hoc network without disposing a base station. When communication with a wireless communication apparatus (terminal) covered by AP operating at another frequency channel is to be performed, it is necessary to connect APs by wired LAN cables. Namely, if covering APs are not connected, communication is not possible even if the wireless communication apparatuses (terminals) physically existing adjacent to each other are covered by different APs.

Also in a high speed wireless PAN system of IEEE 802.15.3, although it is possible to initially scan all frequency channels and search a neighbor coordinator, if an operation starts once at a particular frequency channel, it is not possible to grasp the use state of other frequency channels. Therefore, even if a neighbor Piconet using a different frequency channel exists, communication with a wireless communication connected to the Piconet is impossible.

As above, the conventional methods require a complicated mechanism such as timings of frequency channel switching, a setup process to be realized by message exchange for starting a frequency channel switching operation through mutual synchronization of participating terminals, and an adjustment process to be used for determining frequency channel switching. It is also essential that a central control station initiatively performing control exists, such as AP in IEEE 802.11 and HiperLAN/2 and a master in Bluetooth communication. If the central control station such as AP and a master extinguishes, some protocol process of selecting a substitute central control station or a manual setting change work is necessary, resulting in the problem that communication is intercepted during this process.

A wireless communication system has been proposed which determines a frequency channel by measuring not only interference of own channel but also interference of adjacent channels by using these channels (e.g., refer to Patent Document 1), this system realizing a multi-channel with involvement of a base station.

For example, a method in which a communication station specifies a traffic reception channel by transmitting beacons through the optimum channel for the communication station itself, that is, the local station, can be considered. However, there is a possibility that, even when the channel is the optimum channel for the local station, the channel is one under interference for a communication station receiving the beacons. For example, when a beacon transmission channel of one station is an interference channel of the other station or an unusable channel having deteriorated communication quality, these communication stations fall into a state of a deadlock in which the communication stations cannot eternally recognize mutual existence, though the communication stations can perform communication with each other through the other channels.

[Patent Document 1]
Japanese Patent Application Publication Hei 6-37762

[Non-Patent Document 1]
International Standard ISO/IEC 8802-11:1999(E) ANSI/IEEE Std 802.11, 1999 Edition, Part II: Wireless LAN Medium Access Control (MAC) and Physical Layer (PHY) Specifications

[Non-Patent Document 2]
ETSI Standard ETSI TS 101 761-1 V1.3.1 Broadband Radio Access Networks (BRAN); HIPERLAN Type 2; Data Link Control (DLC) Layer; Part 1: Basic Data Transport Functions

[Non-Patent Document 3]
ETSI Standard ETSI TS 101-761-2 V1.3.1 Broadband Radio Access Network (BRAN); HIPERLAN Type 2; Data Link Control (DLC) Layer; Part 2: Radio Link Control (RLC) sublayer An object of the present invention is to provide an excellent wireless communication system, wireless communication apparatus, wireless communication method and computer program, which can properly configure a suitable ad hoc network without any interference between communication stations in a communication environment where a plurality of channels are prepared.

Another object of the present invention is to provide an excellent wireless communication system, wireless communication apparatus, wireless communication method and computer program, which can perform a channel access by effectively utilizing a plurality of frequency channels in a wireless network of a self-organized distribution type without relationship between a controlling station and a controlled station.

A further object of the present invention is to provide an excellent wireless communication system, a wireless communication apparatus, a wireless communication method and a computer program, all capable of evading a deadlocked state, in which each communication station cannot recognize mutual existence, and capable of forming a self-organized distribution type multi-channel wireless network.

The present invention has been made in consideration of the above-described issues, and a first aspect of the present invention provides a wireless communication system for forming a network by a plurality of wireless communication stations without disposing a control station, in which each communication station transmits a beacon at a predetermined beacon period through its own beacon transmission channel, and transmits an interference annunciation signal describing information related to a channel under interference of a self station through another usable channel at a predetermined period.

The "system" used in this specification means a logical collection of a plurality of apparatuses (or functional modules realizing specific functions) and does not specifically refer to whether each apparatus or function module is accommodated in a single housing.

In the self-organized distribution type wireless communication system, each communication station notifies beacon information in the transmission frame period and executes a scan operation for beacon signals from other stations to recognize the network configuration. In a self-organized distribution type network using multi channels, the transmission frames are multiplexed on the frequency axis as many as the number of usable channels. Therefore, a communication station cannot receive a beacon unless it moves to the same channel as that of another communication, at the beacon transmission timing, resulting in that a new entry station is difficult to determine its own beacon transmission timing and transmission channel.

Moreover, there is the possibility that a channel is an optimum one for a communication station but the channel is one under interference for another station as a communications partner. For example, when a beacon transmission channel of one station is an interference channel or an unusable channel having deteriorated communication quality for the other station, these communication stations fall into a state of a deadlock in which the communication stations cannot eternally recognize mutual existence, though the communication stations can perform communication with each other through the other channels.

Accordingly, the present invention considers the following matters. That is, each communication station periodically transmits a beacon signal by means of a channel having the smallest degree of interference for the local station among a plurality of frequency channels. Moreover, in some interference situations, a beacon transmission channel selected in accordance with a criterion for the local station is not always a channel capable of being received by all neighbor communication stations. In specific, a communication station under interference from another system is made to transmit a particular signal called as interference annunciation signal periodically through all of the channels under no interference to inform neighbor stations of the existence of the local station and of the channel under interference.

Moreover, a neighbor communication station which has received the interference annunciation signal from another station compares its own beacon transmission channel with interference information of the interference annunciation signal. Then, when it becomes clear that a beacon is transmitted through a channel whose interference level is high, the neighbor communication station changes its beacon transmission channel. Similarly, also at the time of receiving a beacon, the neighbor communication station monitors an interference situation at any time, and selects a channel through which it can easily hear a beacon from a communication station which wants to perform communication frequently. That is, the transmission of beacons is to be suppressed in a channel under interference to a degree at which the beacons cannot be heard.

Consequently, according to the present invention, each communication station can determine a communication channel to evade interference efficiently in a self-organized distributed manner, and further can considerably improve communication capability by utilizing a plurality of channels effectively.

Moreover, a communication station is made to perform a channel scanning operation of each channel at a period which does not synchronize with the transmission period of an interference annunciation signal.

The channel scanning operation enables to discover a new beacon of a station newly entering the network and to detect secession of a beacon of a station existed in the network. Moreover, by performing the channel scanning at a period which does not synchronize with the transmission period of interference annunciation signals, it becomes possible to receive an interference annunciation signal IAS from a neighbor station surely at a frequency of once every several times at the time of channel scanning. Consequently, even if communication stations are in a state of being impossible of receiving mutual beacons owing to interference, receiving the interference annunciation signals periodically enables to evade a deadlock.

Moreover, a communication station may be configured not to transmit any interference annunciation signals when there are no channels under interference. By omitting transmission of unnecessary interference annunciation signals, the availability of transmission paths can be improved, and furthermore the power consumption of the apparatus can be decreased.

A communication station transmits an interference annunciation signal at a period sufficiently longer than a beacon interval. Each communication station can discover a new beacon of a station newly entering the network and detect secession of a beacon of a station existed in the network by performing a multi-channel scanning operation at a period which does not synchronize with the transmission period of interference annunciation signals. Moreover, by performing channel scanning at a period which does not synchronize with the transmission period of interference annunciation signals, a communication station can surely receive an interference annunciation signal IAS from neighbor stations at the frequency of once every several times at the time of channel scanning.

Now, when communication through a specific channel is difficult owing to the interference from a certain strong interference source, it is expected that the possibility that a neighbor terminal is also under similar interference is high. As a result, on a condition of the existence of interference, it is conceivable that a packet informing the interference needlessly increases.

Moreover, the packet informing interference is not utilized unless a change such as an entry of a new terminal from another network is not produced. In other words, it is ineffective to transmit interference annunciation signals at a high frequency even in a steady state. Moreover, because a communication station cannot perform data transmission during a period in which another station transmits the interference annunciation signals, the high frequency transmission is an overhead of the system.

Accordingly, when it becomes clear that neighbor terminals having the same interference exist elsewhere as a result of an examination of neighbor terminals, the communication station changes the transmission frequency of the interference annunciation signals to transmit them at a thinned-out frequency according to the number of the neighbor terminals having the same interference. As a result, although the transmission sphere of the packets informing the interference of each communication station is somewhat shifted, the packets are informed at the same frequency on an average as the whole system.

Moreover, when a new entry station appears in a wireless system, there is the possibility that a phenomenon in which the networks themselves overlap each other has been generated in a case of the appearance of the new entry communication station from another network. In such a case, for notifying the new entry station of a network configuration and interference channel information at an early stage, the existing communication station is required to transmit interference annunciation signals at a frequency equal to or more than a predetermined value. Accordingly, the communication station makes the possibility of the new entry station's discovery of the interference annunciation signals higher by increasing the transmission frequency of the interference annunciation signal for a predetermined time period (for example, by setting the transmission frequency to be same as a beacon interval) in response to the new entry of the communication station from the other network. Moreover, when the communication station detects a new entry station, the communication station informs neighbor stations of the existence of the new entry station, and increases the transmission frequency of the interference annunciation signal only for a predetermined time period in response to the reception of such information.

Moreover, when a station enters a wireless system, for early information of a network configuration and interference channel information, it is necessary to transmit an interference annunciation signal at a frequency equal to or more than a predetermined value. However, after the completion of the entering operation, the necessity of the information of interference is gradually decreasing. Accordingly, the communication station may gradually decrease the transmission frequency of interference annunciation signals from an initial value according to the elapsed time from the entering of the new communication station.

Moreover, a second aspect of the present invention is a computer program described in a computer readable format for executing wireless communication processing on a computer system for operating in a self-organized distributed manner under a wireless communication environment, the program characterized by comprising: an interference annunciation signal generation step for generating a beacon signal and an interference annunciation signal, both describing information related to a channel under interference of a local station; an interference annunciation signal analysis step for analyzing the beacon signal and the interference annunciation signal, both received from a neighbor station; a channel setting step for setting a data transmission and reception channel; and a communication control step for controlling a transmission operation of the beacon signal and the interference annunciation signal of the local station, and a reception operation of the beacon signal and the interference annunciation signal from the neighbor station.

The computer program according to the second aspect of the present invention is one defining the computer program described in the computer readable format for implementing predetermined processing on the computer system. In other words, by installing the computer program according to the second aspect of the present invention into the computer system, a cooperative operation is exhibited on the computer system, and the computer system operates as a wireless communication apparatus. By constituting a wireless network by starting a plurality of such wireless communication apparatus, similar operations and advantages as those of the wireless communication system according to the first aspect of the present invention can be obtained.

According to the present invention, an excellent wireless communication system, wireless communication apparatus, wireless communication method and computer program can be provided which can configure reliably a proper ad hoc network without any interference between communication stations in a communication environment preparing a plurality of channels.

Further, according to the present invention, an excellent wireless communication system, wireless communication apparatus, wireless communication method and computer program can be provided which can perform a channel access by effectively using a plurality of frequency channels in a self-organized distribution wireless network without relationship between a controlling station and a controlled station.

Moreover, according to the present invention, it is possible to provide an excellent wireless communication system, a wireless communication apparatus, a wireless communication method and a computer program, all capable of evading a deadlocked state in which each communication station cannot recognize mutual existence, and capable of forming a self-organized distribution type multi-channel wireless network.

Moreover, according to the present invention, in a self-organized distribution type multi-channel wireless network, each communication station efficiently performs frequency arrangement, and thereby the throughput of the whole system is improved, and further the influences to neighbor other wireless systems can be decreased.

Other objects, features and advantages of the present invention will become apparent from the preferred embodiments of the present invention to be described later and the detailed description given in conjunction with the accompanying drawings.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Figure 1:
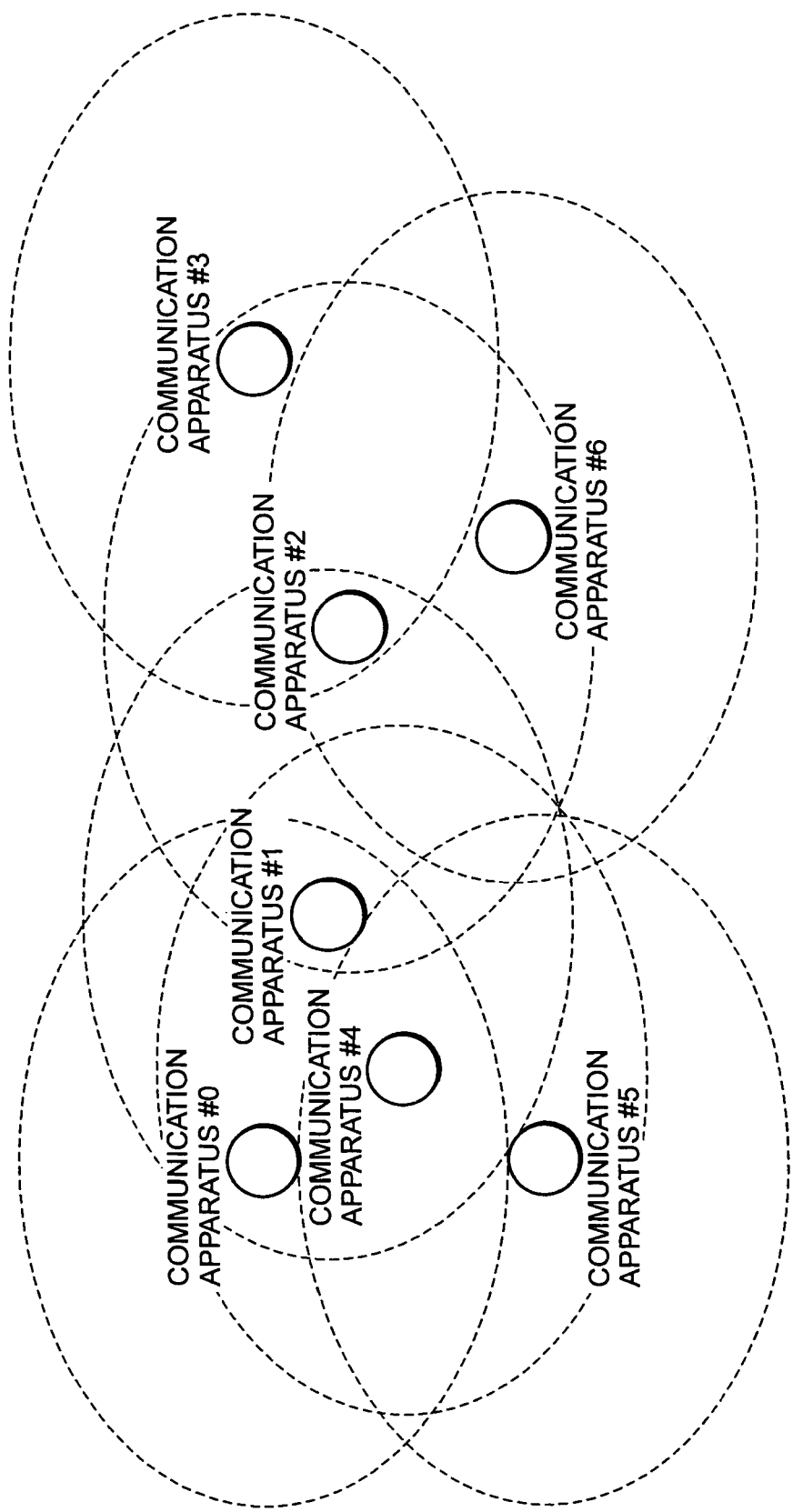
FIG. 1 is an example of the arrangement of communication apparatuses constituting a wireless communication system according to a preferred embodiment of the present invention.

The preferred embodiments of the present invention will be described in detail with reference to the drawings.

A. System Configuration

Communication transmission paths assumed in the present invention are wireless, and a network is configured among a plurality of communication stations by using transmission media constituted of a plurality of frequency channels. Communication assumed in the present invention is traffics of a storage exchange type, and information is transferred in the unit of a packet.

A wireless network system according to the present invention has a self-organized distribution type system structure without disposing a coordinator, and executes a transmission control effectively utilizing a plurality of channels by using a transmission (MAC) frame having a loosely synchronized time division multiple access structure. Each communication station can execute ad hoc communication for direct and asynchronous information transmission in accordance with an access procedure based on Carrier Sense Multiple Access (CSMA).

In the wireless communication system without particularly disposing a control station as described above, that is, system without relationship between a controlling station and a controlled station, each communication station notifies beacon information to let another neighbor communication station (i.e., in a communication range) know the existence of the local communication station, and informs of a network configuration. A communication station newly entering a communication range of some communication station can detect that it entered the communication range, by receiving a beacon signal, and can know the network configuration by analyzing information written in the beacon. Since the communication station transmits a beacon at the start of a transmission frame period, the transmission frame period at each channel used by each communication station is defined by a beacon interval.

Each wireless communication apparatus arbitrarily determines one of available channels as a criterion channel, and defines a predetermined transmission frame period in the criterion channel. The criterion channel is selected among multi channels on the basis of a criterion for a station, for example, whether or not a target channel provides good communication quality for the station. In such a case, there is a possibility that an optimum channel for the local station is a channel under interference for another communication station receiving a beacon. The present embodiment prepares a construction of informing neighbor stations of its own existence, the information related to the channel under interference, and the like by utilizing the channels other than the criterion channel, and thereby evades falling into a deadlocked state. The details of the construction will be described later.

The process to be executed at each communication station to be described hereunder is fundamentally a process to be executed by all communication stations participating in the ad hoc network of the present invention. However, in some cases, not all the communication stations constituting the network execute the process to be described hereunder.

FIG. 1 shows an example of the arrangement of communication apparatuses constituting a wireless communication system according to a preferred embodiment of the present invention. In this wireless communication system, a particular control station is not disposed and each communication apparatus operates in a self-organized and distributive manner to configure the ad hoc network. FIG. 1 shows the state that communication apparatuses #0 to #6 are distributed in the same space.

A communication range of each communication apparatus is indicated by a broken line in FIG. 1, and defined as not only the range in which communication with other communication apparatuses are possible but also the range that a signal transmitted from own station interferes. Namely, the communication apparatus #0 is in the range capable of communicating with the neighbor communication apparatuses #1 and #4, the communication apparatus #1 is in the range capable of communicating with the neighbor communication apparatuses #0, #2 and #4, the communication apparatus #2 is in the range capable of communicating with the neighbor communication apparatuses #1, #3 and #6, the communication apparatus #3 is in the range capable of communicating with the neighbor communication apparatus #2, the communication apparatus #4 is in the range capable of communicating with the neighbor communication apparatuses #0, #1 and #5, the communication apparatus #5 is in the range capable of communicating with the neighbor communication apparatus #4, and the communication apparatus #6 is in the range capable of communicating with the neighbor communication apparatus #2.

While communication is performed between particular communication apparatuses, there is a communication apparatus, i.e., a "hidden terminal" which one partner communication apparatus can hear but another partner communication apparatus cannot hear.

Figure 2:
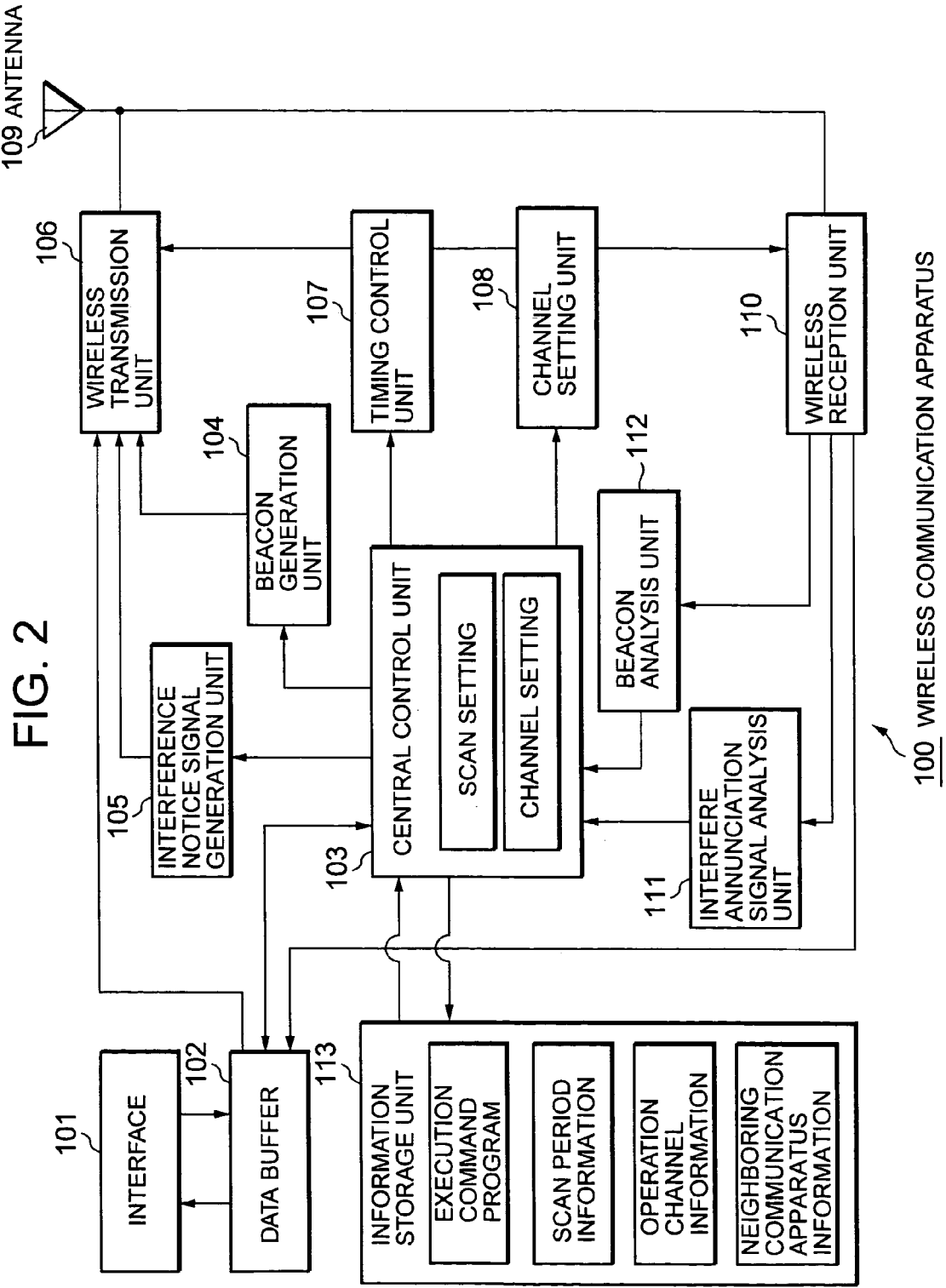
FIG. 2 is a schematic diagram of a functional structure of a wireless communication apparatus operating as a communication station in the wireless network according to a preferred embodiment of the present invention.

FIG. 2 is a schematic diagram of a functional structure of a wireless communication apparatus operating as a communication station in the wireless network according to a preferred embodiment of the present invention. The wireless communication apparatus shown can form a proper ad hoc network without interfering another wireless system by effectively performing a channel access in the same wireless system.

A wireless communication apparatus 100 is composed of an interface 101, a data buffer 102, a central control unit 103, a beacon generation unit 104, an interference annunciation signal generation unit 105, a wireless transmission unit 106, a timing control unit 107, a channel setting unit 108, an antenna 109, a wireless reception unit 110, an interference annunciation signal analysis unit 111, a beacon analysis unit 112 and an information storage unit 113.

The interface 101 exchanges various information with an external apparatus (e.g., a personal computer (not shown) or the like) connected to the wireless communication apparatus 100.

The data buffer 102 is used for temporarily storing data sent from an apparatus connected via the interface 101 or data received via a wireless transmission path, before the data is sent out via the interface 101.

The central control unit 103 collectively manages a series of information transmission and reception processes at the wireless communication apparatus 100 and performs an access control of each transmission path (scan setting, channel setting and the like in multi channels).

The beacon generation unit 104 generates a beacon signal to be periodically exchanged with neighbor wireless communication apparatuses. In order for the wireless communication apparatus 100 to run the wireless network, own beacon transmission slot position of each channel, own reception slot position of each channel, a reception slot position of a beacon from a neighbor communication apparatus of each channel, and own scan operation period of each channel are stipulated. This information is stored in the information storage unit 113 and written in the beacon signal to notify it to a neighbor wireless communication apparatus. The structure of a beacon signal will be later described. Since the wireless communication apparatus 100 transmits a beacon at the start of a transmission frame period, the transmission frame period of each channel used by the wireless communication apparatus 100 is defined by the beacon interval.

The interference annunciation signal generation unit 105 generates an interference annunciation signal (IAS) for informing neighbor stations of the information related to its own existence and a channel under interference through a channel other than a criterion channel.

The wireless transmission unit 106 performs a predetermined modulation process in order to wirelessly transmit data, beacon and the interference annunciation signal IAS of its own station temporarily stored in the data buffer 102.

The antenna 109 transmits signals through a selected frequency channel to another wireless communication apparatus, or collects signals transmitted from other wireless communication apparatus. The present embodiment is configured to have a single antenna and not to perform transmission and reception parallelly. Moreover, the embodiment is configured not to be able to handle a plurality of frequency channels at the same time.

The wireless reception unit 110 executes a process of receiving signals including information, the beacon and the interference annunciation signal sent from another wireless communication apparatus at a predetermined time. As a wireless transmission and reception method for the wireless transmission unit 106 and the wireless reception unit 110, for example, various communication methods suitable for relatively near distance communication applicable to a wireless LAN may be applied. Specifically, a UWB method, an OFDM method, a CDMA method or the like can be adopted.

The timing control unit 107 controls timing for transmitting and receiving wireless signals. For example, the timing control unit 107 controls its own beacon transmission timing at the head of a transmission frame period in a beacon transmission channel, the transmission timing of the interference annunciation signals IAS in another available channel, a scan operation period in each channel, beacon reception timing from other communication apparatus in each channel, and the like.

The channel setting unit 108 selects a channel through which a multi-channel system wireless signal is actually transmitted or received. In specific, the channel setting unit 108 sets the optimum channel interference among a plurality of prepared frequency channels as the beacon transmitting channel of the local station, and sets all of the channels not being under interference as annunciation channels of interference annunciation signals IAS.

The interference annunciation signal analysis unit 111 analyzes the interference annunciation signals IAS of other wireless communication apparatus which can be received on each channel to obtain information or the like related to the channel used as the criterion channel of the station, and to the channels under interference.

The beacon analysis unit 112 analyzes a beacon signal received from another wireless communication apparatus to analyze existence and the like of another neighbor wireless communication apparatus. For example, information such as a beacon reception timing of each channel, a beacon transmission timing written in a beacon received from another communication apparatus, interference information and a neighbor beacon reception timing, is stored in the information storage unit 113 as neighbor apparatus information.

The information storage unit 113 stores execution procedure commands of a series of access control operations and the like to be executed by the central control unit 103 (programs for performing scan setting, channel setting and the like), beacon transmission timing of other communication stations, the transmission timing of interference annunciation signals IAS, multi-channel information, neighbor apparatus information, interference information of each channel of its own station and neighbor stations, and the like.

In this embodiment, in the communication environment preparing a plurality of channels, the wireless communication apparatus 100 operating as a communication station performs a transmission control by effectively using a plurality of channels by a transmission (MAC) frame having a loosely synchronized time division multiplex access structure or a communication operation such as a random access based on CSMA/CA, in an ad hoc network without disposing a particular control station.

Each communication station notifies beacon information to let another neighbor communication station (i.e., in a communication range) know the existence of the local communication station, and informs of a network configuration. A communication station newly entering in a communication range of some communication station can detect that it entered the communication range, by receiving a beacon signal, and can know the network configuration by analyzing information written in the beacon.

A beacon transmission procedure at each communication station according to this embodiment will be described with reference to FIG. 3.

Assuming that information capable of being transmitted by a beacon is 100 bytes, the time taken to transmit it is 18 μs. Since one transmission is executed every 40 ms, a media occupying factor by a beacon at each communication station is as sufficiently small as one 2222-nd.

Each communication station synchronizes loosely while hearing a beacon transmitted in a neighboring area. When a new communication station appears, the new communication station sets own beacon transmission timing so as not to collide with the beacon transmission timings of already existing communication stations.

If there is no communication station in a neighboring area, a communication station 01 can start transmitting a beacon at a proper timing. A beacon transmission interval is 40 ms (described already). In an example of the uppermost stage shown in FIG. 2, B01 indicates the beacon transmitted from the communication station 01.

A communication station newly entering the communication range thereafter sets own beacon transmission timing so as not to collide with the arrangement of already existing beacons. In this case, since each communication station acquires a transmission guaranteed period (TGP) immediately after beacon transmission, it is preferable that beacon transmission timings of respective communication stations are not congested but are uniformly distributed on a single channel from the viewpoint of a transmission efficiency. Therefore, in this embodiment, transmitting a beacon starts basically at generally a middle point in the longest beacon interval period in a range where it is possible to hear the beacon.

Figure 3:
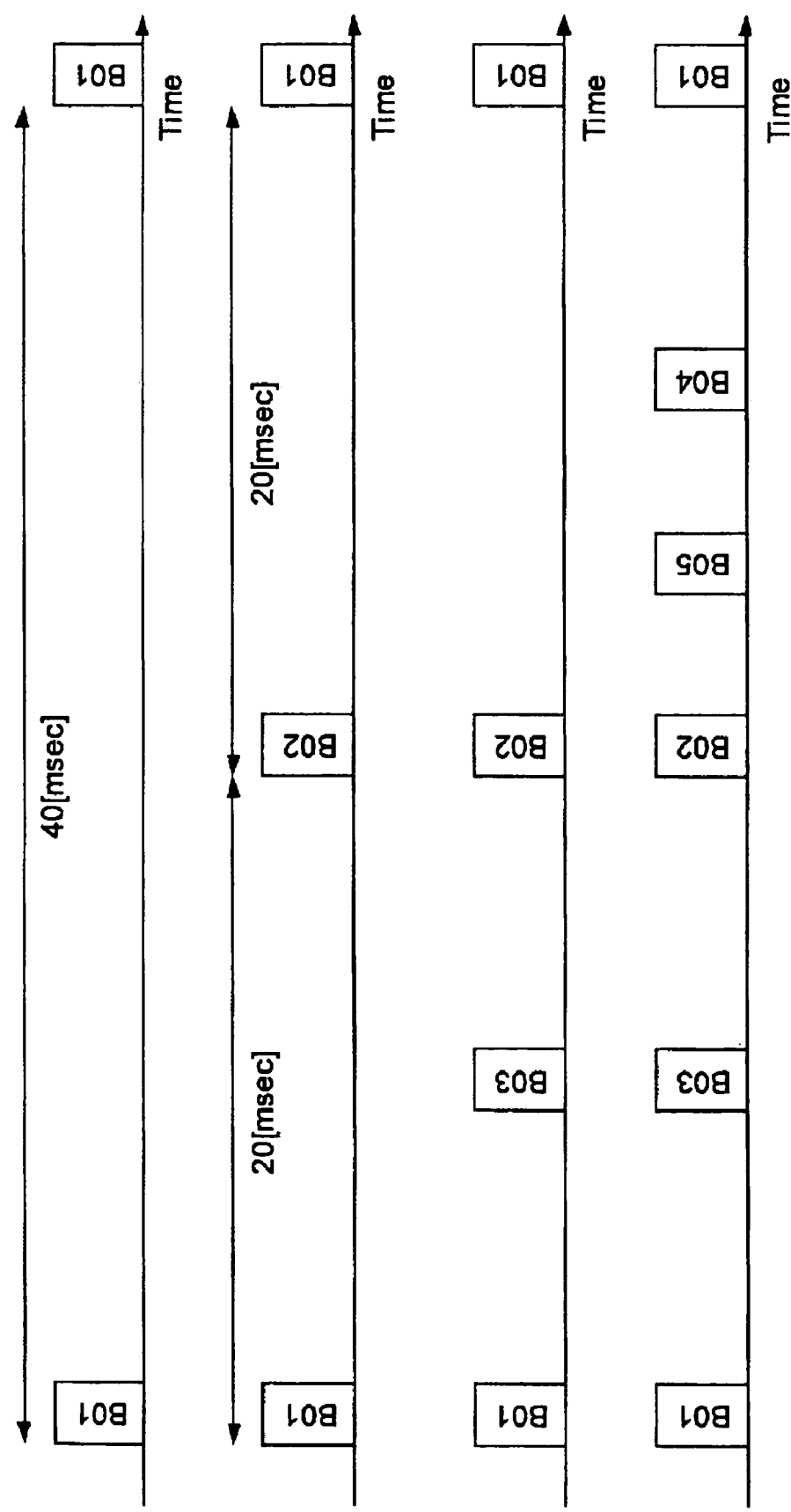
FIG. 3 is a view explaining a beacon transmission procedure at each communication station according to this embodiment.

It is assumed for example that a new communication station 02 appears in the network state that only the communication station 01 exists as shown in the uppermost stage of FIG. 3. In this case, the communication station 02 receives the beacon from the communication station 01 to recognize its existence and a beacon position, and as shown at the second stage of FIG. 3, sets own beacon transmission timing generally at the middle of the beacon interval of the communication station 01 to start beacon transmission.

It is assumed that another new communication station 03 appears. In this case, the communication station 03 receives at least one of the beacons transmitted from the communication station 01 and the communication station 02 to recognize the existence of these already existing communication stations. As shown at the third stage of FIG. 3, transmission starts generally at the middle of the interval of beacons transmitted from the communication station 01 and the communication station 02.

Subsequently, each time a new communication station enters a neighboring area in accordance with the similar algorithm, the beacon interval is narrowed. For example, as shown at the lowermost stage of FIG. 3, a communication station 04 appearing next sets the beacon transmission timing at generally the middle of the beacon interval set by the communication station 02 and the communication station 01, and a communication station 05 appearing second next sets the beacon transmission timing at generally the middle of the beacon interval set by the communication station 02 and the communication station 04.

A minimum beacon interval Bmin is defined so that the band (transmission frame period) is not made in excess of beacons. Two or more beacon transmission timings are not permitted to be set in Bmin. For example, if the minimum beacon interval Bmin is defined to be 2.5 ms in the transmission frame period of 40 ms, sixteen communication stations can be accommodated at a maximum in the range where radio waves can reach.

Figure 4:
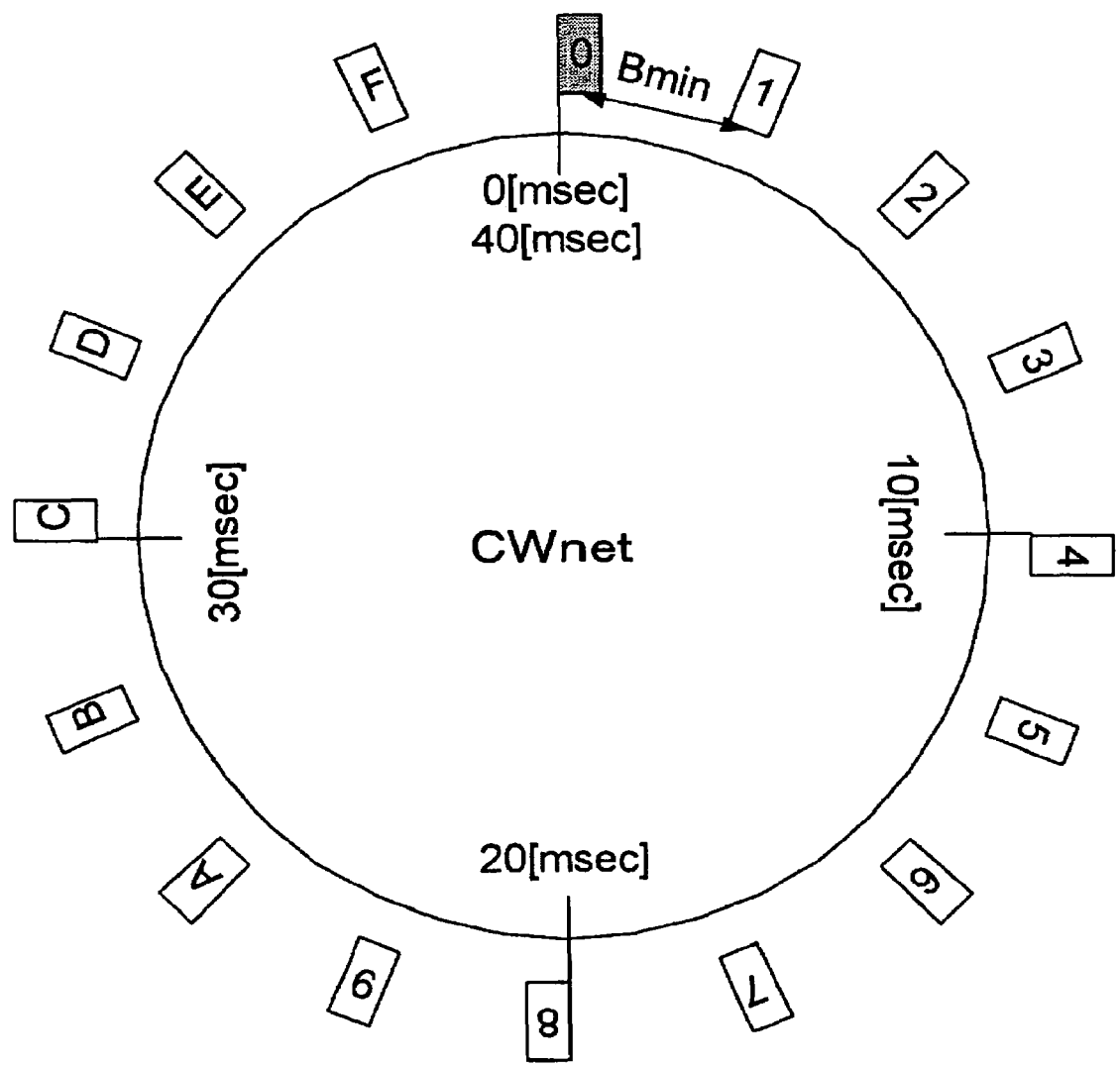
FIG. 4 is a new showing an example of beacon transmission timings on one channel.

FIG. 4 shows an example of beacon transmission timings in a single channel. In this example shown in FIG. 4, a lapse of time in the transmission frame period of 40 ms is drawn as a clock whose hands move on a ring in a clockwise direction.

In the example shown in FIG. 4, sixteen communication stations 0 to F constitute nodes of the network. As described with reference to FIG. 3, it is assumed that beacons are disposed in accordance with the algorithm that beacon transmission timings of new entry stations are sequentially set generally at the middle of a beacon interval set by already existing communication stations. If Bmin is set to 2.5 ms, communication stations larger in number than that defined by Bmin cannot enter the network.

Figure 5:
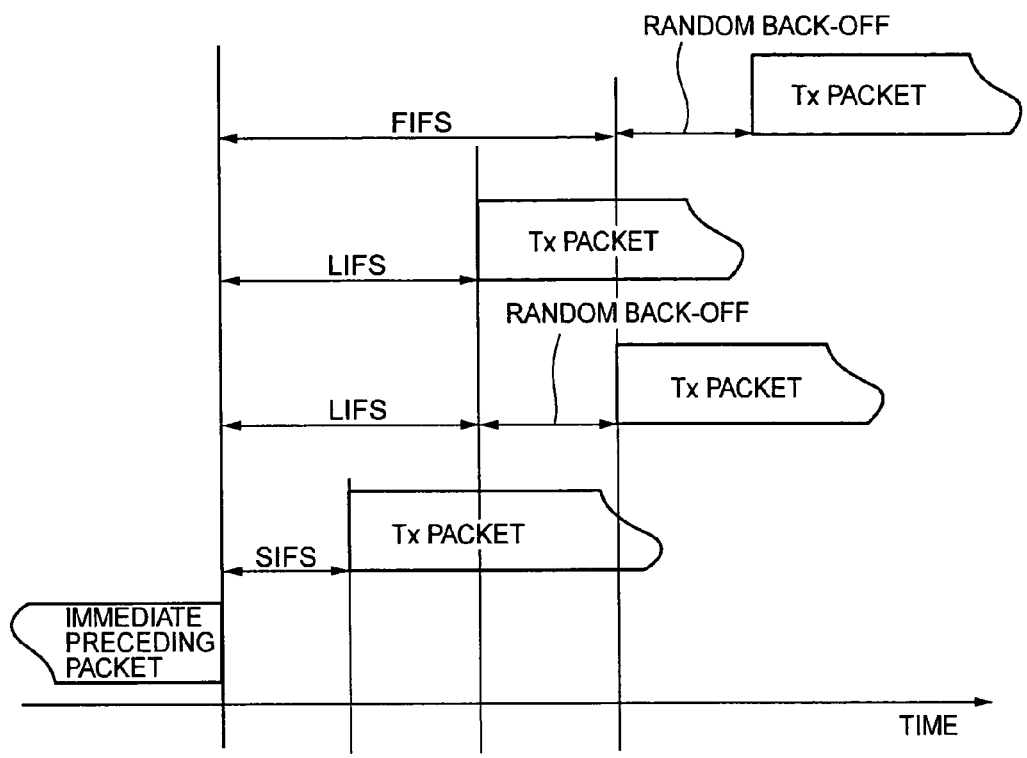
FIG. 5 is a view explaining definition of a packet interval.

Similar to the IEEE 802.11 method or the like, also in this embodiment a plurality of packet intervals are defined. The definition of a packet interval will be described with reference to FIG. 5. Defined for the packet interval are Short Inter Frame Space (SIFS) and Long Inter Frame Space (LIFS). Only those packets given a priority are allowed to be transmitted at the SIFS packet interval, and the other packets are allowed to be transmitted after is it confirmed that media are cleared by a packet interval of LIFS+a random back-off whose value is determined randomly. As a method of calculating a random back-off value, a method known in already existing techniques may be applied.

Also in this embodiment, in addition to the above-described packet intervals "SIFS" and "LIFS+back-off", the "LIFS" and "FIFS+back-off" (FIFS: Far Inter Frame Space" are defined. Although the "SIFS" and "LIFS+back-off" are generally applied, in the time period while some communication station is given a transmission priority, other stations use the packet interval "FIFS+back-off" and the station given the priority uses the packet interval SIFS or LIFS.

Figure 6:
FIG. 6 is a view showing how priority is assigned to a station which transmitted a beacon.
Figure 7:
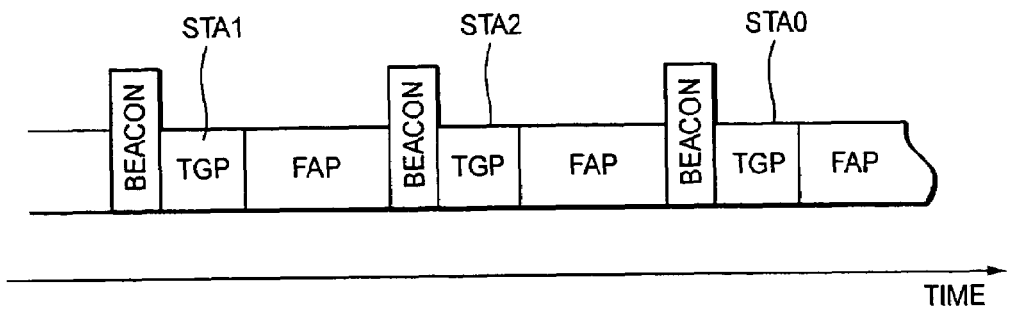
FIG. 7 is a view showing a structure of transmission frame periods.

Although each communication station transmits beacons at a constant interval, the station transmitted the beacon is assigned a transmission priority during some period after the beacon is transmitted. FIG. 6 shows how the priority is assigned to the station transmitted a beacon. This priority period is defined as Transmission Prioritized Period (TPP). The period other than TPP is defined as Fairly Access Period (FAP). FIG. 7 shows the structure of a transmission frame period. As shown in FIG. 7, after the communication station transmits a beacon, TPP is assigned to the communication station transmitted the beacon, and after the lapse of time corresponding to the length of TPP, FAP enters which is terminated when a next communication station transmits a beacon. In this example, although TPP starts immediately after the beacon is transmitted, the invention is not limited to this. For example, the start time of TPP may be set to a relative position (time) from the beacon transmission time.

The packet interval is studied again as in the following. Each communication station executes transmission at the interval of LIFS+back-off in the FAP period. Beacon and packet transmissions in TPP of own station are permitted at the SIFS interval. Packet transmission in TPP of own station is also permitted at the LIFS interval. Packet transmission in TPP of another station is performed at the interval of FIFS+back-off. In the IEEE 802.11 scheme, although the packet interval is always FIFS+back-off, in the structure shown in FIG. 6, the interval can be shortened so that a packet can be transmitted more efficiently.

In the above description, although only the communication station in TPP is assigned the prioritized transmission privilege, the prioritized transmission privilege is also assigned to a communication station called by the communication station in TPP. In TPP, transmission is fundamentally made preferentially. However, if there is no information to be transmitted from the local communication station and another communication station has information to be transmitted to the local communication station, then a Paging message or a Polling message may be sent to the "other station".

Conversely, if own station has no information to be transmitted although the beacon was transmitted and own station does not know that another station has information to be transmitted to own station, then this own station and discards the transmission priority given in TPP. The other station starts transmission after the lapse of LIFS+back-off or FIFS+back-off even in this time period.

By considering the structure that TPP follows immediately after a beacon is transmitted as shown in FIG. 7, it is more preferable in terms of a transmission efficiency that the beacon transmission timings of each communication station are not congested but are uniformly distributed in the transmission frame period. Therefore, in this embodiment, fundamentally a beacon transmission starts generally at the middle of the longest beacon interval in a range where the local station can hear it. However, there is a method by which beacon transmission timings of respective communication stations are arranged in a concentrated manner, and during the remaining transmission frame period, the reception operation is stopped to reduce the consumption power.

Figure 8:
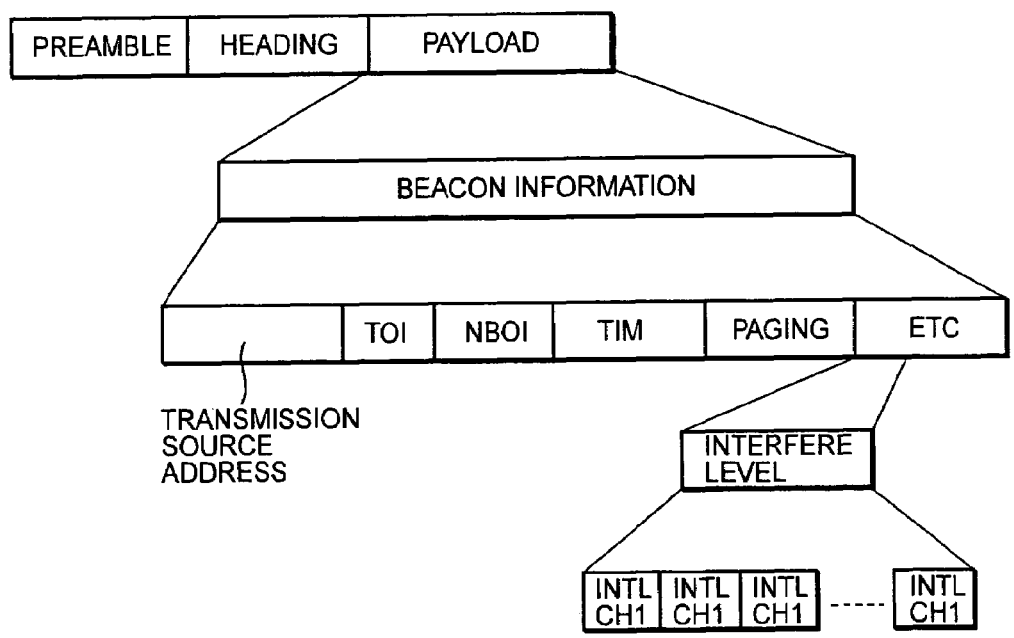
FIG. 8 is a view showing a structural example of a beacon signal format.

FIG. 8 shows an example of the structure of a beacon signal format. As shown in FIG. 8, a beacon signal has a preamble for notifying the existence of the signal, followed by a heading and a payload field PSDU. The heading-field describes the information that the packet is the beacon. Information desired to be notified by the beacon, as follows, is described in the PSDU.

TX.ADDR: a MAC address of a transmission station (TX)
TOI: a TBTT offset indicator (TBTT Offset Indicator)
NBOI: neighbor beacon offset information
TIM: a traffic indication map
PAGE: paging The TIM is annunciation information indicating which communication station the information owned by the communication station is addressed to. By referring to the TIM, a reception station can recognize that the reception station itself should perform reception. Moreover, Paging is a field indicating that the field is scheduled to be transmitted in the TPP immediately after the time among the reception stations inserted in the TIM. A station specified by the field should prepare the reception at the TPP. The other field (ETC field) is also prepared. The ETC field may include an Interfere Information field for describing the degree of interference, i.e., the level of the degree of interference (IntLCH), in each of the prepared frequency channels.

NBOI is information representative of the arrangement of beacons of neighbor communication stations. In this embodiment, sixteen beacons can be disposed at each channel and in the transmission frame period at a maximum. Therefore, NBOI is structured as a 16-bit length field corresponding to each beacon position, and the information of the arrangement of beacons capable of being received is written in a bit map format. By using the beacon transmission timing of the local station as a criteria, 1 is written at a bit corresponding to a relative position of a beacon reception timing from each communication station. A bit position corresponding to the relative position of a timing when a beacon is not received is kept unchanged to 0. In this embodiment, NBOI information is prepared for each of usable frequency channels.

Figure 9:
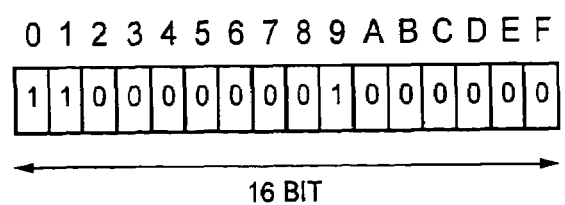
FIG. 9 is a view showing an example of a NBOI description.

FIG. 9 shows an example of a NBOI description. In the example shown in FIG. 9, the NBOI field notifies that a communication station 0 shown in FIG. 3 "can receive beacons from a communication station 1 and a communication station 9". A mark is assigned to a bit corresponding to the relative position of a receivable beacon if the beacon has already been received, and a space is assigned if the beacon is not still received. A mark may be assigned to the bit corresponding to the timing that the beacon is not still received, for the purposes other than the above description.

Each communication station mutually receives beacon signals and in accordance with NBOI contained in each beacon signal, can arrange own beacon transmission timing so as to avoid collision of the beacon on each of usable frequency channels and can detect the beacon reception timing from another station.

Figure 10:
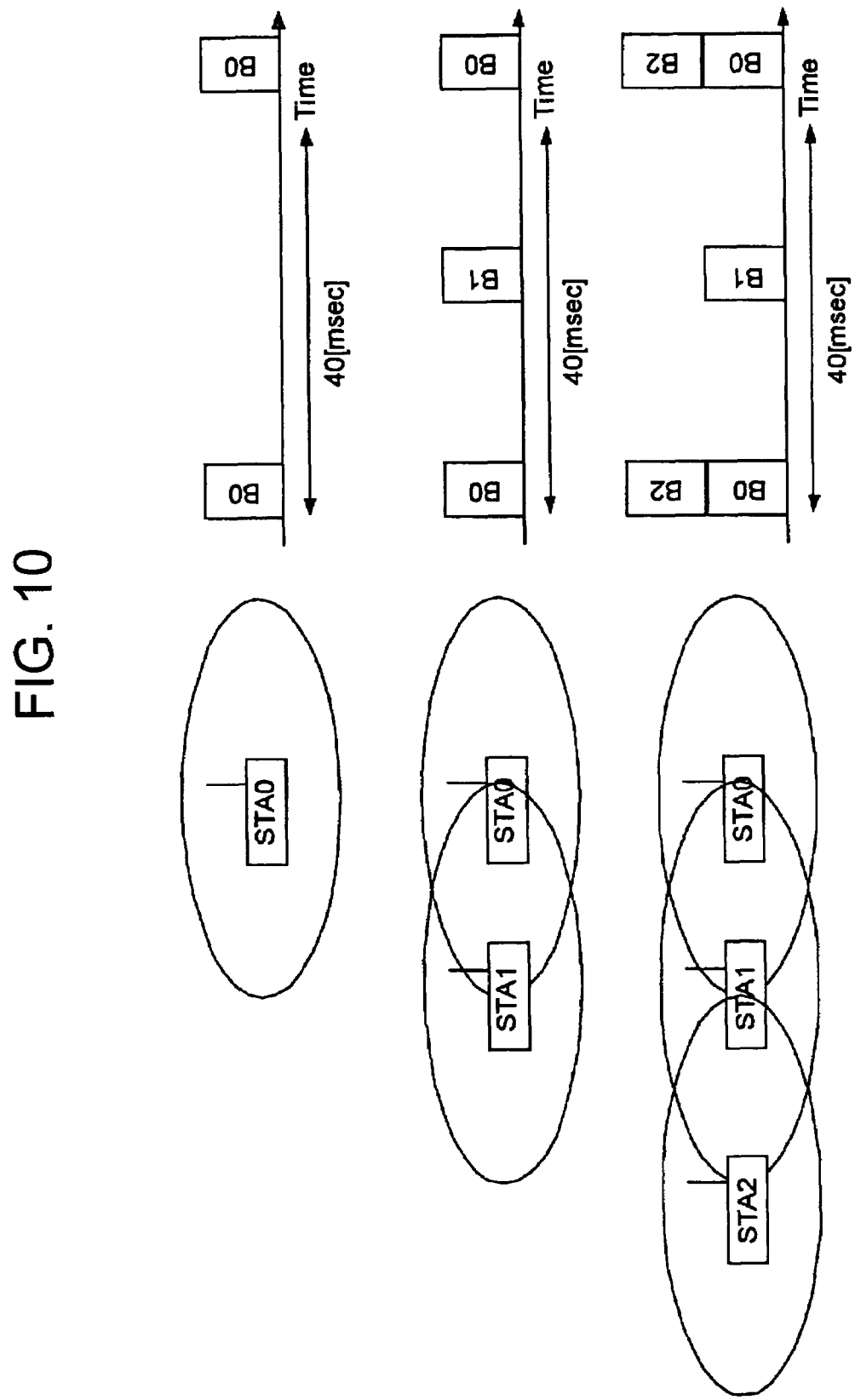
FIG. 10 is a view showing how a new entry station arranges own beacon transmission timing on some frequency channel in accordance with the description in NBOI, while avoiding a collision with already existing beacons.

FIG. 10 shows how a new entry station arranges own beacon transmission timing on some frequency channel in accordance with the description in NBOI, while avoiding a collision with already existing beacons. Each stage shown in FIG. 10 indicates an entry state of communication stations STA0 to STA2. The left side of each stage indicates an arrangement state of each communication station and the right side indicates an arrangement of beacons transmitted from the stations.

The uppermost stage shown in FIG. 10 shows that only the communication station STA0 exists. STA0 tries to receive a beacon but cannot receive it so that it sets a proper beacon transmission timing and can start transmitting a beacon when this timing comes. A beacon is transmitted every 40 ms (transmission frame). All bits in the NBOI field described in the beacon transmitted from STA0 are 0.

The middle stage shown in FIG. 10 shows that STA1 enters within the communication range of the communication station STA0. STA1 tries to receive a beacon and-receives the beacon from STA0 Since all bits in the NBOI field other than the bit corresponding to own transmission timing are 0, own beacon transmitting timing is set substantially at the middle of the beacon interval of STA0 in accordance with the above-described process procedure.

In the NBOI field of the beacon transmitted from STA1, 1 is set to the bit representative of own transmission timing and the bit representative of a reception timing of the beacon from STA0, and 0 is set to all other bits. As STA0 recognizes the beacon from STA1, 1 is set to the corresponding bit position of the NBOI field.

The lowermost stage shown in FIG. 10 shows that STA2 enters the communication range of the communication station STA1. In the example shown in FIG. 10, STA0 is a hidden terminal relative to STA2. Therefore, STA2 cannot recognize that STA1 receives the beacon from STA0 so that as shown in the right side, there is a possibility that STA2 transmits the beacon at the same timings as those of STA0 and a collision occurs.

The NBOI field is used to evade this phenomenon. In the NBOI field of the beacon of STA1, 1 is set to the bit representative of own transmission timing and the bit representative of the beacon transmission timing of STA0. Although STA2 cannot directly receive the beacon transmitted from the hidden terminal STA0, STA2 can recognize the beacon transmission timing of STA0 from the beacon received from STA1 and can avoid the beacon transmission at this timing.

Figure 11:
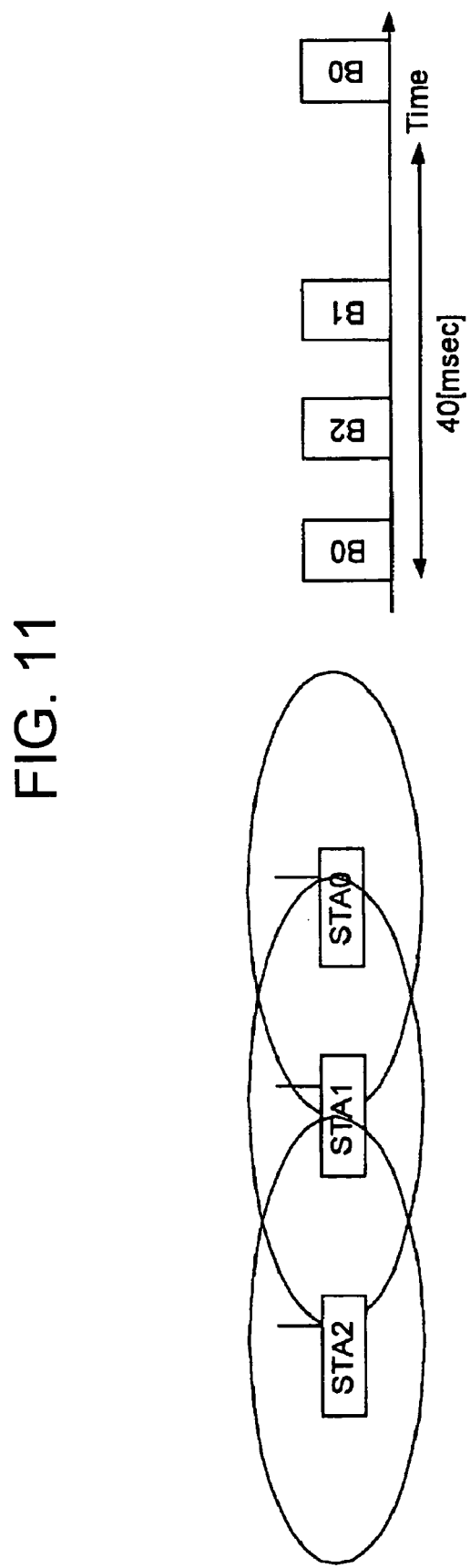
FIG. 11 is a view showing how the new entry station arranges own beacon transmission timing while avoiding the beacon transmission timing of a hidden terminal on the basis of received beacon information.

As shown in FIG. 11, STA2 sets the beacon transmission timing substantially at the middle of the beacon interval of STA0 and STA1. Obviously, in NBOI of the beacon transmitted from STA2, 1 is set to the bits representative of the beacon transmission timings of STA2 and STA1. With the beacon collision avoiding function based upon the description in the NBOI field, the beacon position of the hidden terminal, i.e., the neighbor station two stations ahead can be grasped and a beacon collision can be avoided.

B. Evading of Interference and Deadlock in Multi-Channel Environment

Figure 12:
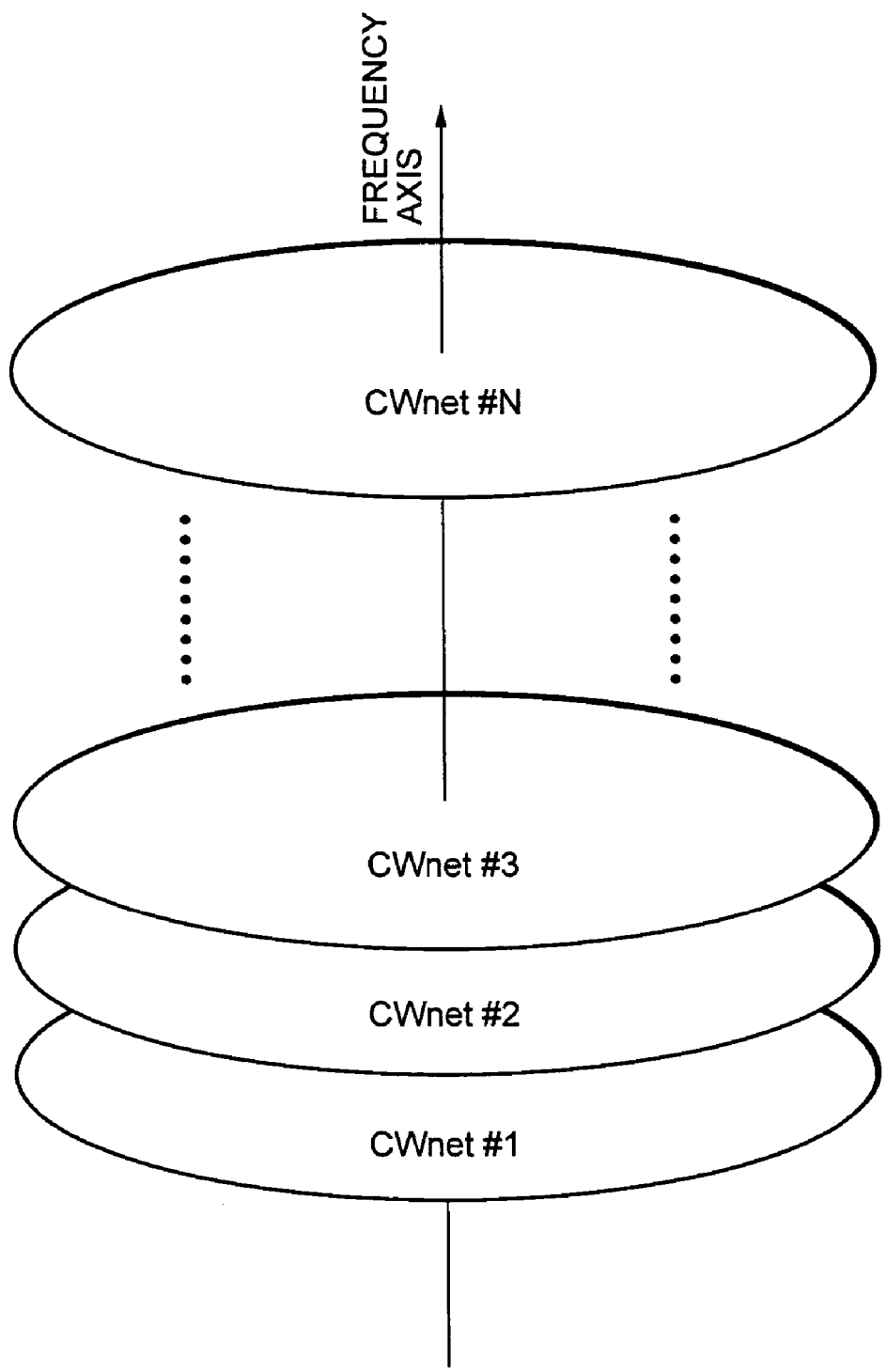
FIG. 12 is a view schematically showing a transmission frame structure of a self-organized distribution type multichannel wireless communication system.

As described above, in a self-organized distribution type wireless communication system, each communication station notifies beacon information in the transmission frame period and beacon signals from other stations are scanned so that the network configuration on a single channel can be recognized. In a case of the self-organized distribution type multi-channel network of this embodiment, however, the transmission frames such as shown in FIG. 4 corresponding in number to the number of usable channels are disposed on the frequency axis (refer to FIG. 12). Therefore, each communication station cannot receive a beacon unless it moves to the same channel at the beacon transmission timing of another communication station. Thus, it is difficult to know the network configuration in all channels.

Moreover, it may be possible that a channel which is an optimum one for a communication channel is one under interference for the other station being a communication partner. For example, when a beacon transmission channel of one station is an interference channel of the other station or an unusable channel having deteriorated communication quality, these communication stations fall into a state of a deadlock in which the communication stations cannot eternally recognize mutual existence, even though the communication stations can perform communication with each other through the other channels.

Figure 13:
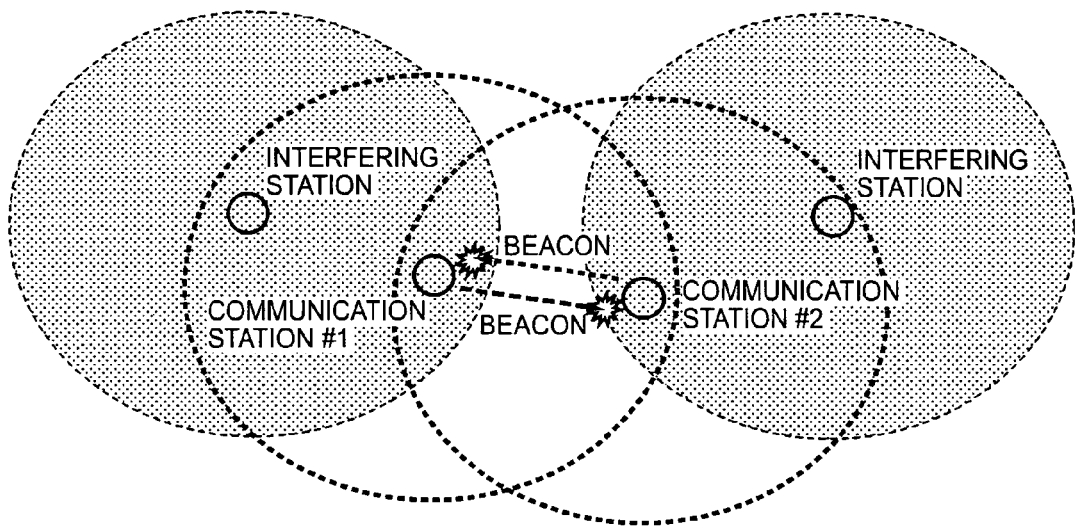
FIG. 13 is a view showing a deadlocked state in a case where a beacon transmission channel of a station on one side is an interference channel or an unusable channel having deteriorated communication quality for another station on the other side.

As described above, in this embodiment, it is supposed that each communication station is provided with a single antenna and does not perform transmission and reception parallelly, and that it is not possible to handle a plurality of frequency channels at the same time. Hereupon, a state in which two communication stations are arranged in an interference environment as shown in FIG. 13 is examined.

A communication station #1 is arranged in a communication environment in which the communication station #1 is under interference in a channel CH1 but is not under interference in a channel CH2 (being clear), which environment is designated by oblique lines inclined to the left. The communication station #1 sets the channel CH2 as a beacon transmission channel of the local station. Moreover, a communication station #2 is arranged in a communication environment in which the communication station #2 is under interference in the channel CH2 but is not under interference in the channel CH1 (being clear), which environment is designated by oblique lines inclined to the-right. The communication station #2 sets the channel CH1 as the beacon transmission channel of the local station. Because the communication stations #1 and #2 transmit beacons through mutual interference channels in this situation, the communication stations #1 and #2 cannot recognize the mutual existence eternally.

Figure 14:
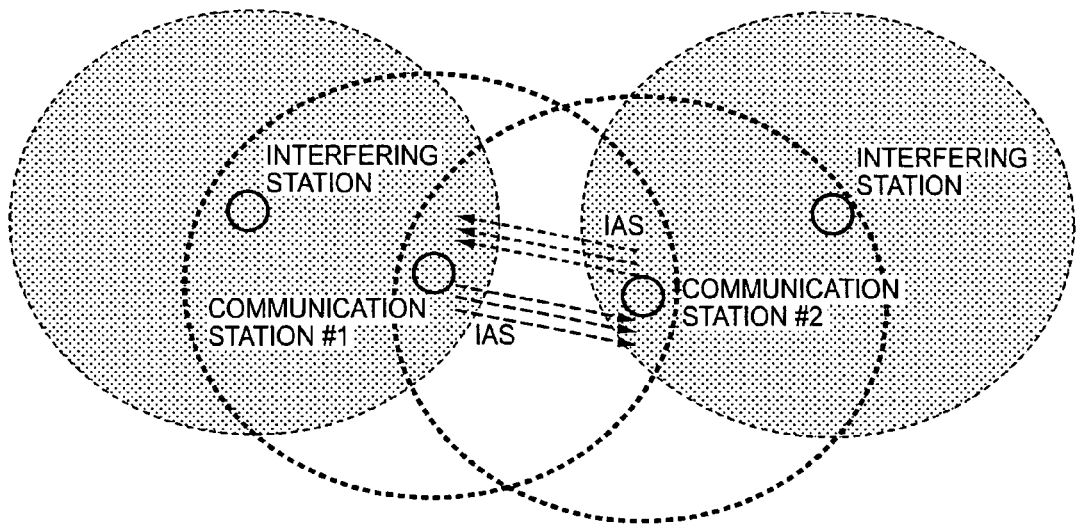
FIG. 14 is a view showing a state in which a communication station periodically transmits an interference annunciation signal IAS through all channels under no interference for informing neighbor stations of a channel under interference.

Accordingly, the following matters are considered. That is, each communication station periodically transmits a beacon signal by means of a channel having the smallest degree of interference for the local station among a plurality of frequency channels. Moreover, in some interference situations, a beacon transmission channel selected in accordance with a criterion for the local station is not always a channel capable of being received by all neighbor communication stations. In specific, a communication station under interference from another system is made to transmit an interference annunciation signal IAS periodically through all of the channels not being under interference to inform neighbor stations of self existence and of the channel under interference (see FIG. 14). Moreover, with regard to a channel under interference in a degree of impossible of hearing any beacons, the neighbor stations are requested not to transmit beacons through the channel.

A communication station transmits an interference annunciation signal IAS at, for example, a period sufficiently longer than a beacon interval. Moreover, the communication station performs a scan operation of the interference annunciation signals IAS at a beacon period or a several-beacon period on each channel not under interference.

Figure 15:
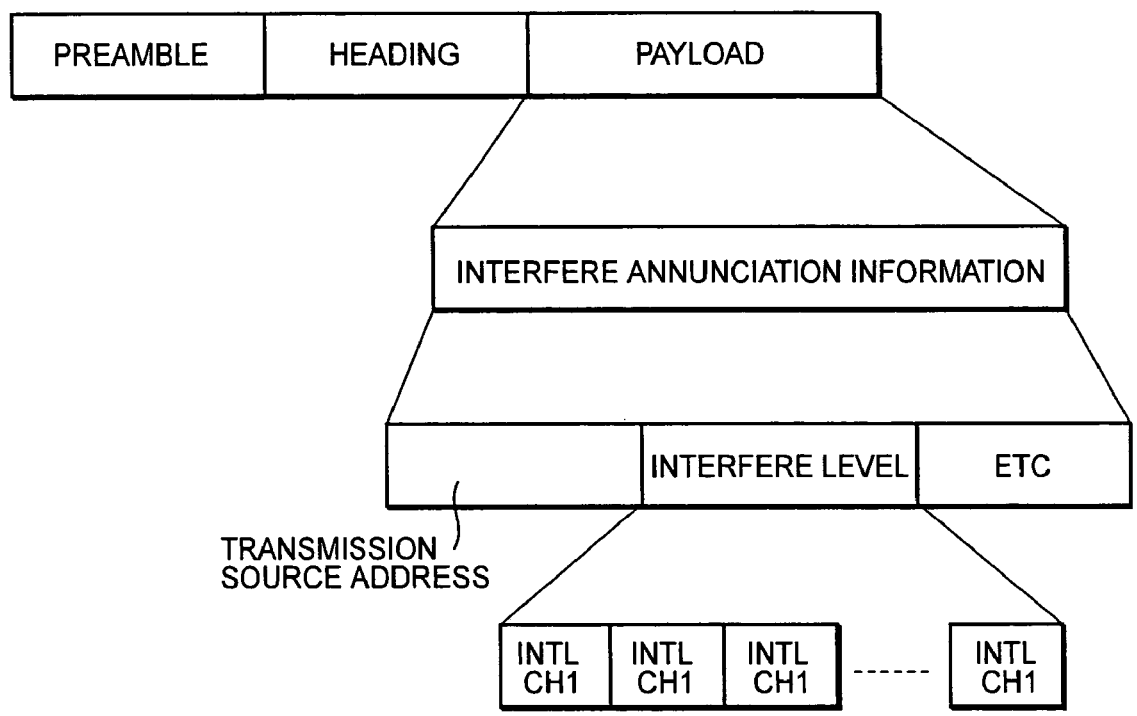
FIG. 15 is a view showing a format configuration example of an interference annunciation signal IAS.

FIG. 15 shows a format configuration example of an interference annunciation signal IAS. As shown in the drawing, the interference annunciation signal IAS includes a preamble for informing the existence of the signal, which preamble is followed by a heading and a payload portion PSDU. In the heading region, the information indicating that the packet is the interference annunciation signal IAS is inserted.

In view of the object of the interference annunciation signal IAS informing the interference situation of the local station in each channel, the PSDU is configured to be simpler than the configuration of a beacon signal to have a smaller total amount of data. In the example shown in FIG. 15, TX.ADDR being a MAC address of the transmission station, an interfere level field for describing a degree of receiving interference, i.e. the level of the degree of interference (IntLCH), in each of the prepared frequency channels, and the other field (ETC field) are prepared in the PSDU.

A neighbor communication station which has received an interference annunciation signal IAS from another station compares information regarding its own beacon transmission channel with the interference information of the interference annunciation signal IAS. Then, when it becomes clear that the communication station transmits beacons through a channel in which an interference level is high, the communication station changes the beacon transmission channel to a channel through which the other stations can easily hear the beacons. Similarly, the communication station monitors interference situations at any time also in a case of receiving beacons, and selects a channel through which beacons are easy to hear for a communication station which wants to perform communication frequently.

By such a cooperative operations of each communication station through the exchange of the interference annunciation signals IAS, a communication channel is determined in a self-organized distributed manner, and all pieces of interference can be avoided. In addition, by utilizing a plurality of channels effectively, communication capability can be considerably improved.

Figure 16:
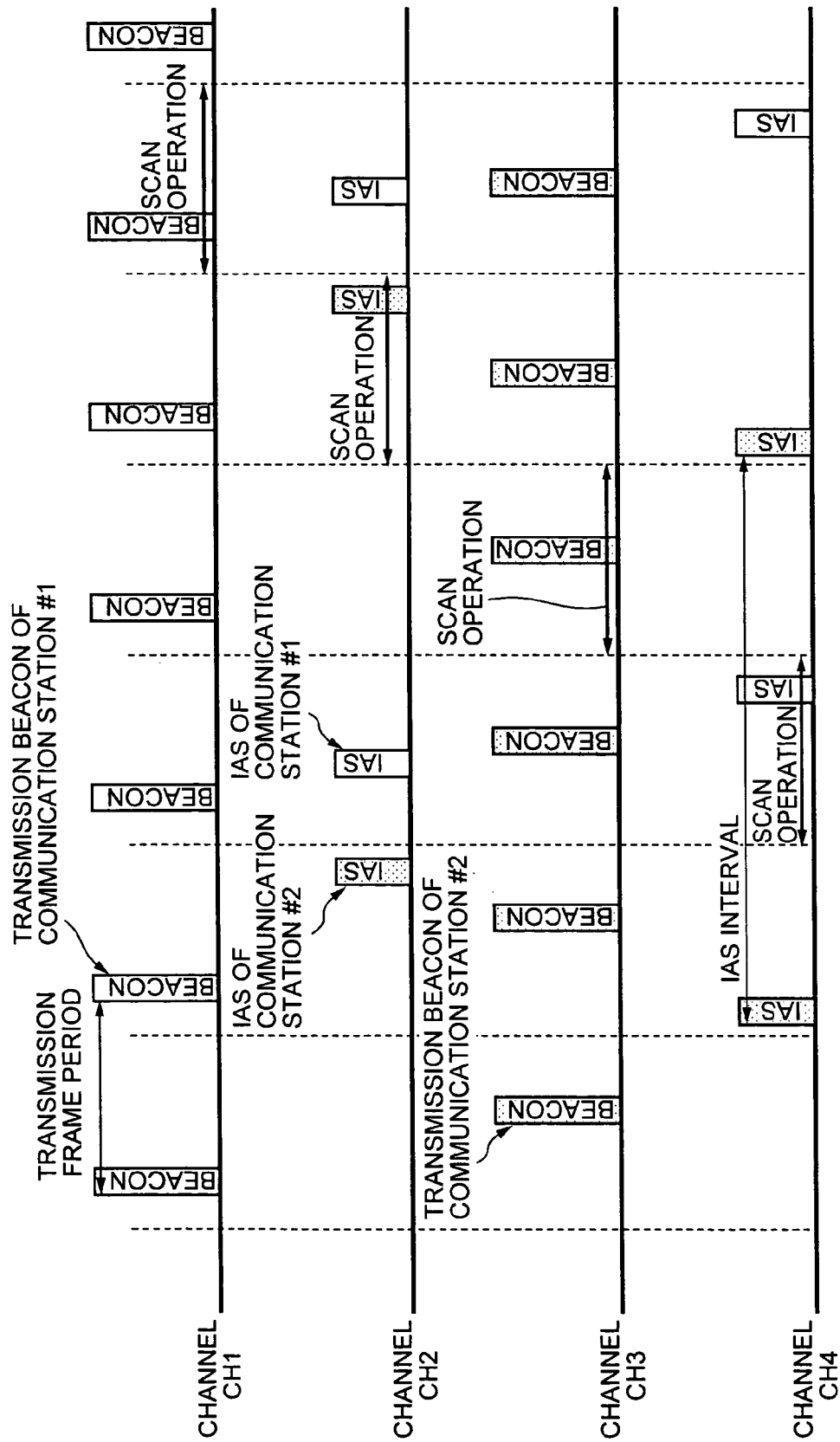
FIG. 16 is a view showing a state in which each station of two arranged communication stations performs a periodical beacon transmission operation and a scan operation of interference annunciation signals IAS in each channel.

FIG. 16 shows a state in which, in a case where two communication stations are arranged, each station periodically performs a beacon transmission operation and a scan operation of interference annunciation signals IAS on each channel. In the example shown in the drawing, four channels CH1-CH4 available as a wireless communication system are prepared.

The communication station #1 on one side sets a channel CH1 as the beacon transmission channel of its own station, and performs the transmission of beacons with an interval of a predetermined transmission frame period. Moreover, through other channels CH2 and CH4, through which no beacons are transmitted, the communication station #1 transmits an interference annunciation signal IAS at an IAS transmission period (IAS interval), which is sufficiently longer than the transmission frame period being the beacon interval. Through the channel CH3, the communication station #1 transmits no interference annunciation signals IAS owing to the inferiority of the interference situation of the local station or the other reasons. Incidentally, because it is impossible for a wireless communication apparatus to handle a plurality of frequency channels at the same time in the present embodiment, beacon transmission timing and interference annunciation signal IAS transmission timing are arranged in each channel in order not to overlap on each other in point of time.

Moreover, on the other hand, the communication station #2 sets the channel CH3 as the beacon transmission channel of its own station, and performs the transmission of beacons at an interval of a predetermined transmission frame period. Moreover, through the other channels CH2 and CH4, through which no beacons are transmitted, the communication station #2 transmits the interference annunciation signals IAS of its own station at an IAS transmission period, which is sufficiently longer than the transmission frame period being the beacon interval. Through the channel CH3, the communication station #2 does not perform the transmission of the interference annunciation signals IAS owing to the inferiority of the interference situation of the local station or the other reasons. Incidentally, because a plurality of frequency channels cannot be handled at the same time, the beacon transmission timing and the interference annunciation signal IAS transmission timing are arranged in each channel in order not to be overlapped on each other in point of time.

In a wireless communication system according to the present embodiment, all of the communication stations perform beacon transmission at a transmission frame period having the same length. Moreover, because one communication station surely transmits beacons through the same channel, neighbor stations can grasp a beacon transmission expectation time and the channel after a reception of a beacon, and it becomes possible to receive beacons by performing reception waiting at the timing.

Moreover, each communication station performs the channel scanning operation of each channel at a period which does not synchronize with the transmission period of interference annunciation signals IAS. By the channel scanning operation, the discovery of new beacons and the detection of secession of beacons can be performed. Moreover, by performing the channel scanning at the period which does not synchronize with the transmission period of the interference annunciation signals IAS, as shown in FIG. 16, it is possible to receive interference annunciation signals IAS from neighbor stations surely at the frequency of one time to several times at the time of channel scanning. Consequently, even if communication stations are in the state of impossible of receiving mutual beacons owing to interference, it is possible to evade a deadlock by periodically receiving the interference annunciation signals IAS.

Figure 17:
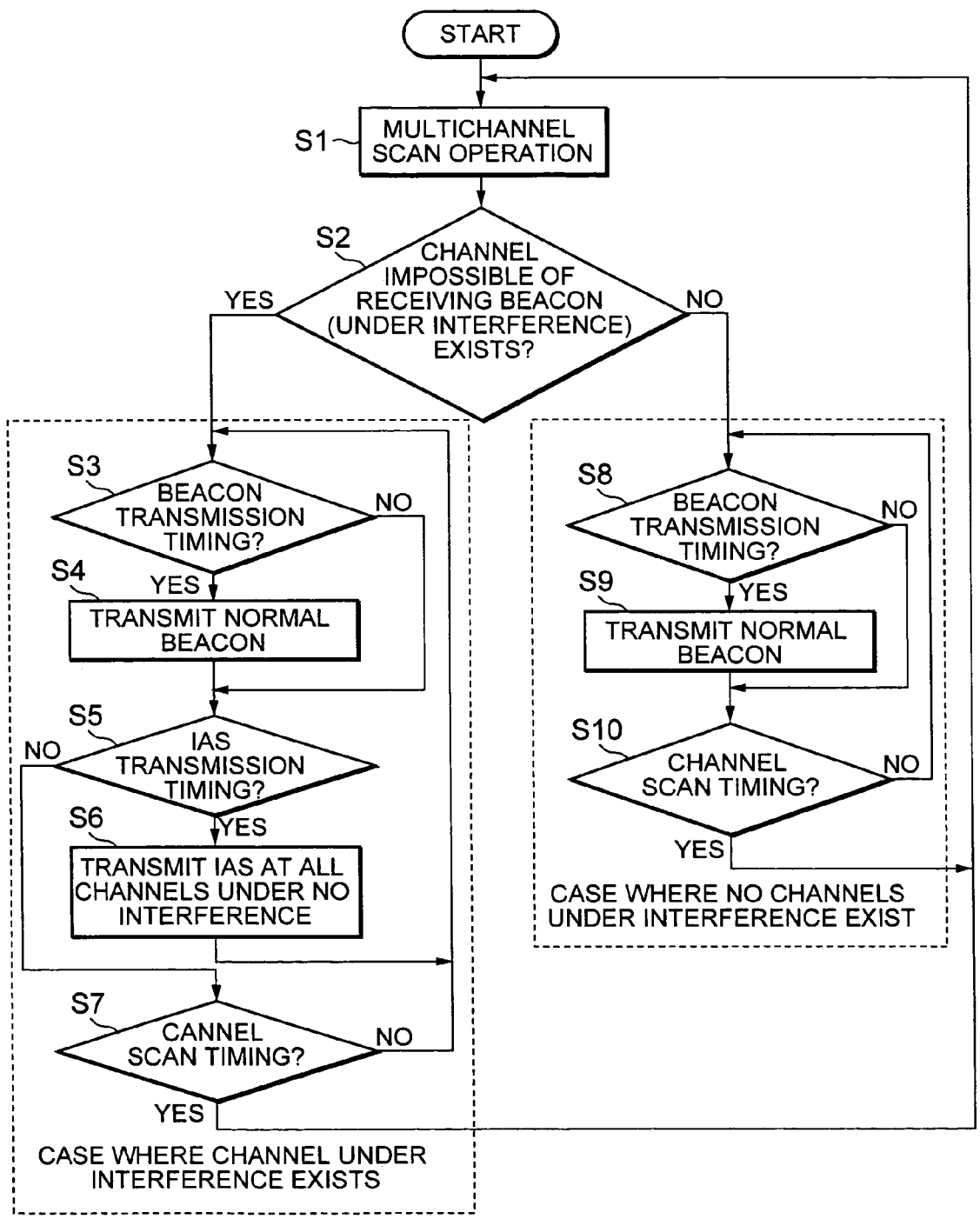
FIG. 17 is a flowchart showing a transmission processing procedure of an interference annunciation signal performed by a communication station.

FIG. 17 shows a transmission processing procedure of interference annunciation signals performed by a communication station in the format of a flowchart. Such a processing operation is actually implemented in a form in which the central control unit 103 of a wireless communication apparatus executes an execution command program stored in the information storage unit 113.

The communication station first executes a scan operation of each channel, i.e. a multi-channel scanning operation, at predetermined timing (step S1).

Then, after the scan operation, the communication station judges whether or not there are any channels through which the local station cannot receive beacons owing to being under interference or the like (step S2). When a channel under interference is detected, the information storage unit 113 stores the channel as a channel through which the transmission of the interference annunciation signals IAS is not performed.

Now, it is judged whether or not the beacon transmission timing of the local station has arrived (step S3). Then, in a case where the beacon transmission timing has arrived, the communication station executes a beacon transmission operation in the beacon transmission channel of the local station (step S4).

Next, the communication station judges whether or not the IAS transmission timing of the local station has arrived (step S5). When the IAS transmission timing of the local station has arrived, the communication station sequentially executes the transmission operation of the interference annunciation signals IAS through all of the channels under no interference (step S6), and then the operation of the communication station returns to the step S3.

Moreover, in a case where the IAS transmission timing of the self station has not arrived yet, the communication station further judges whether or not channel scan timing has arrived (step S7). In a case where the channel scan timing has arrived, the operation of the communication station returns to the step S1, and the communication station executes a multi-channel scanning operation. On the other hand, in a case where the channel scan timing has not arrived, the operation of the communication station returns to the step S3.

Moreover, in a case where it is judged that no channels through which the local station cannot receive beacons exist at the step S2, the communication station judges whether or not the beacon transmission timing of the local station has arrived (step S8). Then, in a case where the beacon transmission timing has arrived, the communication station executes the beacon transmission operations through the beacon transmission channel of the local station (step S9).

Next, the communication station further judges whether or not the channel scan timing has arrived (step S10). In a case where the channel scan timing has arrived, the operation of the communication station returns to the step S1, and the communication station executes the multi-channel scanning operations. On the other hand, in a case where the channel scan timing has not arrived yet, the operation of the communication station returns to the step S8.

In the example shown in the drawing, when there are no channels under interference, the communication station does not transmit any interference annunciation signals IAS. By omitting the transmission of unnecessary interference annunciation signals IAS in such a way, the availability of the transmission paths are improved, and the power consumption of the apparatus can be decreased.

Figure 18:
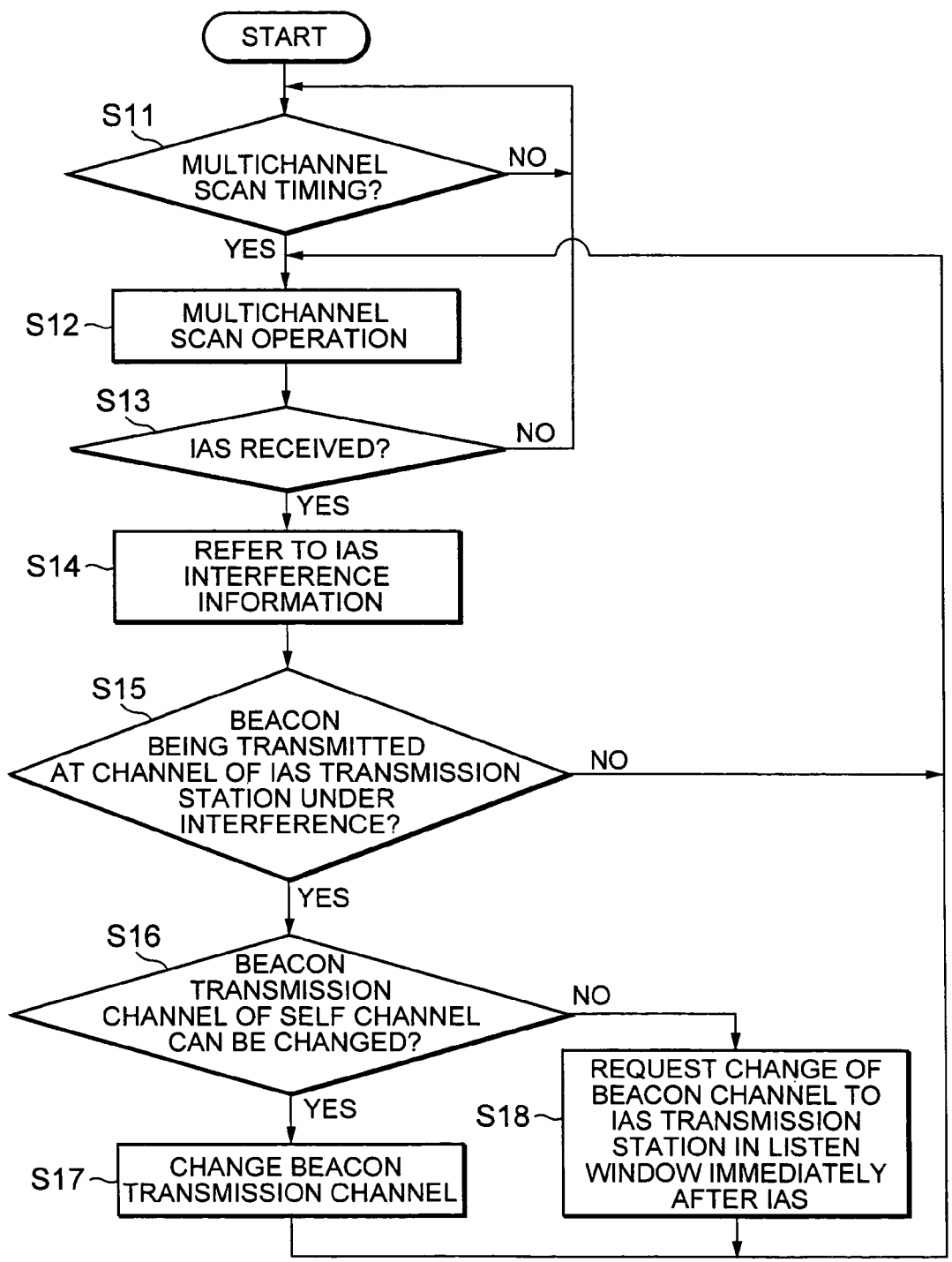
FIG. 18 is a flowchart showing a reception processing procedure of an interference annunciation signal performed by the communication station.

Moreover, in FIG. 18, a reception processing procedure of interference annunciation signals performed by the communication station is shown as the form of a flowchart. Such a processing operation is actually implemented in the form of the execution of an execution command program stored in the information storage unit 113 by the central control unit 103 of the wireless communication apparatus.

The communication station first judges whether or not the timing of the scan operation of each channel, i.e. the multi-channel scanning, has arrived at predetermined timing (step S11). Then, when the timing of the multi-channel scanning has arrived, the communication station executes the scan operation in each channel, i.e. the multi-channel scanning operation (step S12).

Now, the communication station judges whether or not the communication station has received any interference annunciation signals IAS from neighbor stations in the channel through which the scan operations have been performed (step S13). When the communication station has not received any interference annunciation signals IAS, the operation of the communication station returns to the step S11, and the communication station repeatedly executes the multi-channel scanning operation.

Moreover, when the communication station has received any interference annunciation signals IAS, the communication station analyzes the received packets (step S14), and stores the channel interference information of the transmission source into the information storage unit 113.

Then, the communication station judges whether or not the local station is now performing the transmission of beacons by using a channel under interference on the transmission station side of the interference annunciation signals IAS (step S15). When the local station performs the transmission of beacons through a channel other than the ones under interference on the transmission station side of the interference annunciation signals IAS, the operation of the communication station returns to the step S12, and the communication station repeatedly executes the multi-channel scanning operation.

On the other hand, in a case where the local station is performing the transmission of beacons through the channel under interference on the transmission station side of the interference annunciation signals IAS, the communication station judges whether or not there are any channels usable as the beacon transmission channel of the local station among the channels described in the interference annunciation signals IAS from neighbor stations to be channels under no interference (step S16).

Then, in a case where it is judged that the beacon transmission channel of the local station can be changed (step S17), the communication station changes the beacon transmission channel, and stores the contents into the information storage unit 113.

Moreover, in a case where it is judged that the beacon transmission channel of the local station cannot be changed, the communication station transmits a request of a change of the beacon transmission channel to the transmission source in a reception window (Listen Window) immediately after the interference annunciation signal IAS (step S18).

After that, the operation of the communication station returns to the step S12, and the communication station repeatedly executes the multi-channel scanning operation.

C. Transmission Period of Interference Annunciation Signals

As described above, in the self-organized distribution type multi-channel wireless communication system according to the present invention, each communication station is provided with a construction for periodically transmitting a packet (a beacon and an interference annunciation signal) informing the channels difficult for communication through a channel possible of communication. Consequently, when there is a channel difficult for reception, each of the communication stations can recognize the existence of a neighbor terminal located in the channel by receiving the packet informing the interference through the other receivable channels, and can know the interference channel of the terminal.

Moreover, a communication station transmits interference annunciation signals IAS at, for example, a period which is sufficiently longer than the beacon interval. Each communication station performs the channel scanning operation in each channel at a period which does not synchronize with the transmission period of the interference annunciation signals IAS. By the channel scanning operation, each communication station can perform the discovery of new beacons and the detection of secession of beacons. Moreover, by performing the channel scanning at a period which does not synchronize with the transmission period of the interference annunciation signals IAS, as shown in FIG. 16, it is possible to receive the interference annunciation signals IAS from neighbor stations surely at the frequency of once every several times at the time of channel scanning.

Now, in a case where communication through a specific channel is difficult owing to the interference from a certain strong interference source, it is expected that the possibility that a neighbor station is also under similar interference is high. On the condition of the existence of interference, it is conceivable that the interference annunciation signals IAS needlessly increase in the same system as a result of each station's transmission of the interference annunciation signals. Moreover, the packet informing interference is not utilized unless a change such as an entry of a new terminal from another network is not produced. In other words, it is ineffective to transmit interference annunciation signals IAS at a high frequency even in a steady state. Moreover, because a communication station cannot perform data transmission during a transmission period of the interference annunciation signals of another station, the high frequency transmission is an overhead of the system.

Accordingly, in the present embodiment, a communication station transmits interference annunciation signals IAS at a suitable transmission frequency according to a communication situation. In the following, a description is given to the optimum transmission frequency of the interference annunciation signals IAS according to the configuration of a communication system and a situation.

C-1. Transmission Frequency Control of Interference Annunciation Signals According to Number of Terminal Receiving Interference in Same Channel A self-organized distribution control wireless LAN which, in a case where communication is difficult because the interference of a certain channel is strong, periodically informs the existence of the interference channel through the other channel is supposed. It is supposed that each communication station grasps the interference situations of neighbor stations by means of beacons and packets informing the interference.

When the neighbor stations receive the interference in the same channel, these neighbor communication stations mutually transmit packets informing the same interference. As a result, as the whole system, the situation in which interference annunciation signals IAS are needlessly transmitted is brought about.

Accordingly, a construction in which, in a case where neighbor stations receive interference in the same channel, the transmission frequency of the interference annunciation signals IAS is decreased according to the number of the terminals is adopted.

Now, the transmission interval of each communication station beacon is supposed to be T_SF, and the transmission frequency of the interference annunciation signals IAS at the initial state is also set as T_SF.

Figure 19:
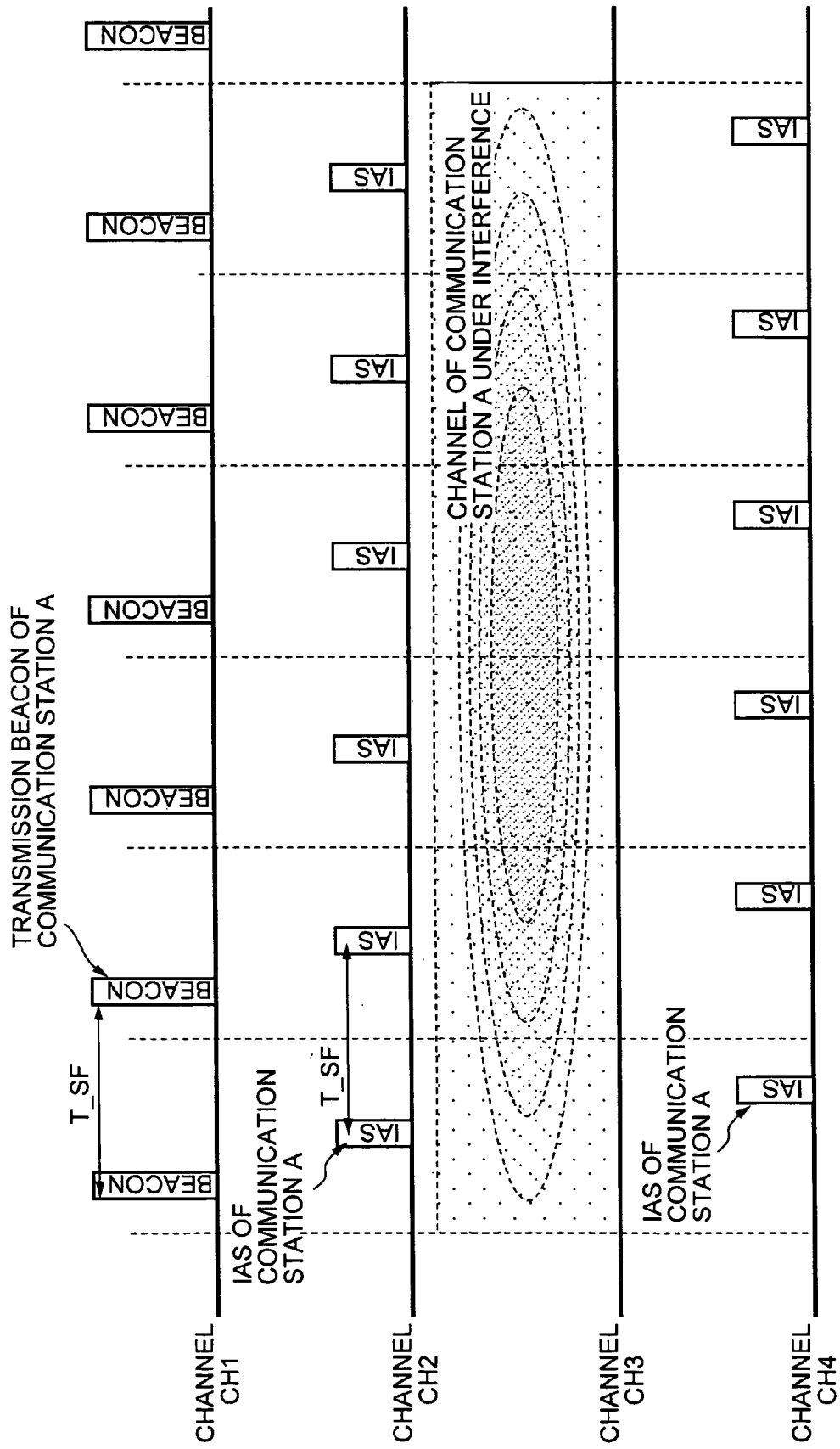
FIG. 19 is a view showing a state in which a communication station arranges beacon transmission positions and interference annunciation signals in each channel.

FIG. 19 shows a state at the time of the first entering of a communication station A into a wireless system provided with the four channels CH1-CH4. In the example shown in the drawing, the communication station A sets the channel CH1 as the beacon transmission channel of its own station, and arranges beacon transmission timing at every beacon interval T_SF in the same channel. Moreover, the communication station A arranges the transmission timing of the interference annunciation signals IAS at the transmission interval same as the beacon interval T_SF in the other channels CH2-CH4. Incidentally, because the communication station channel CH3 is a channel under interference and no communication can perform through the channel CH3, the transmission of the interference signals IAS is not performed through the channel CH3.

It is supposed that two further communication stations having the same interference are located in neighbors as the result of an examination of neighbor stations after beacons are transmitted for a little while after that. In this case, each neighbor station changes its transmission frequency in order to transmit the interference annunciation signals IAS at the interval of T_SF×3 to prevent the useless information of interference. As a result, although the transmission sphere of the interference annunciation signals of each communication station is somewhat shifted from each other, the interference annunciation signals IAS come to be informed at the same frequency as the whole system on an average.

Figure 20:
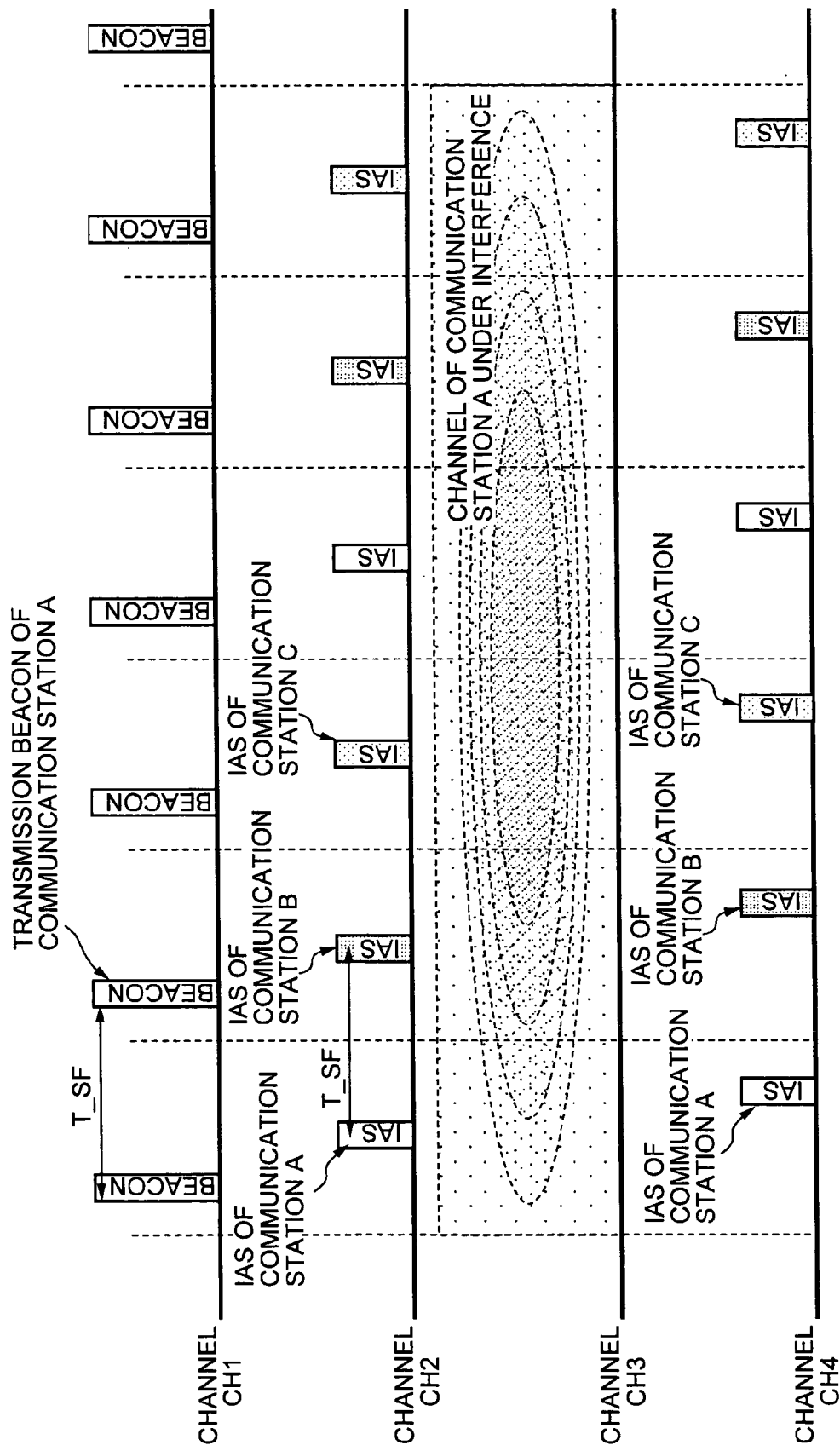
FIG. 20 is a view showing a state in which, when a communication station B and a communication station C newly enter the self-organized distribution communication system composed of four channels shown in FIG. 19 successively to the communication station A, each communication station arranges interference annunciation signals into each channel.

FIG. 20 shows a state in which, when a communication station B and a communication station C newly enter the self-organized distribution communication system composed of four channels shown in FIG. 19 successively to the communication station A, each communication station arranges interference annunciation signals in each channel.

In the example shown in the drawing, the communication station A discovers the existence of the communication stations B and C having the same interference around the communication station A as a result of the examination of neighbor terminals after transmitting beacons for a little while. In this case, each communication station changes its transmission frequency in order to transmit the interference annunciation signals IAS at the interval of T_SF×3 for preventing the performance of the useless information of interference.

Figure 21:
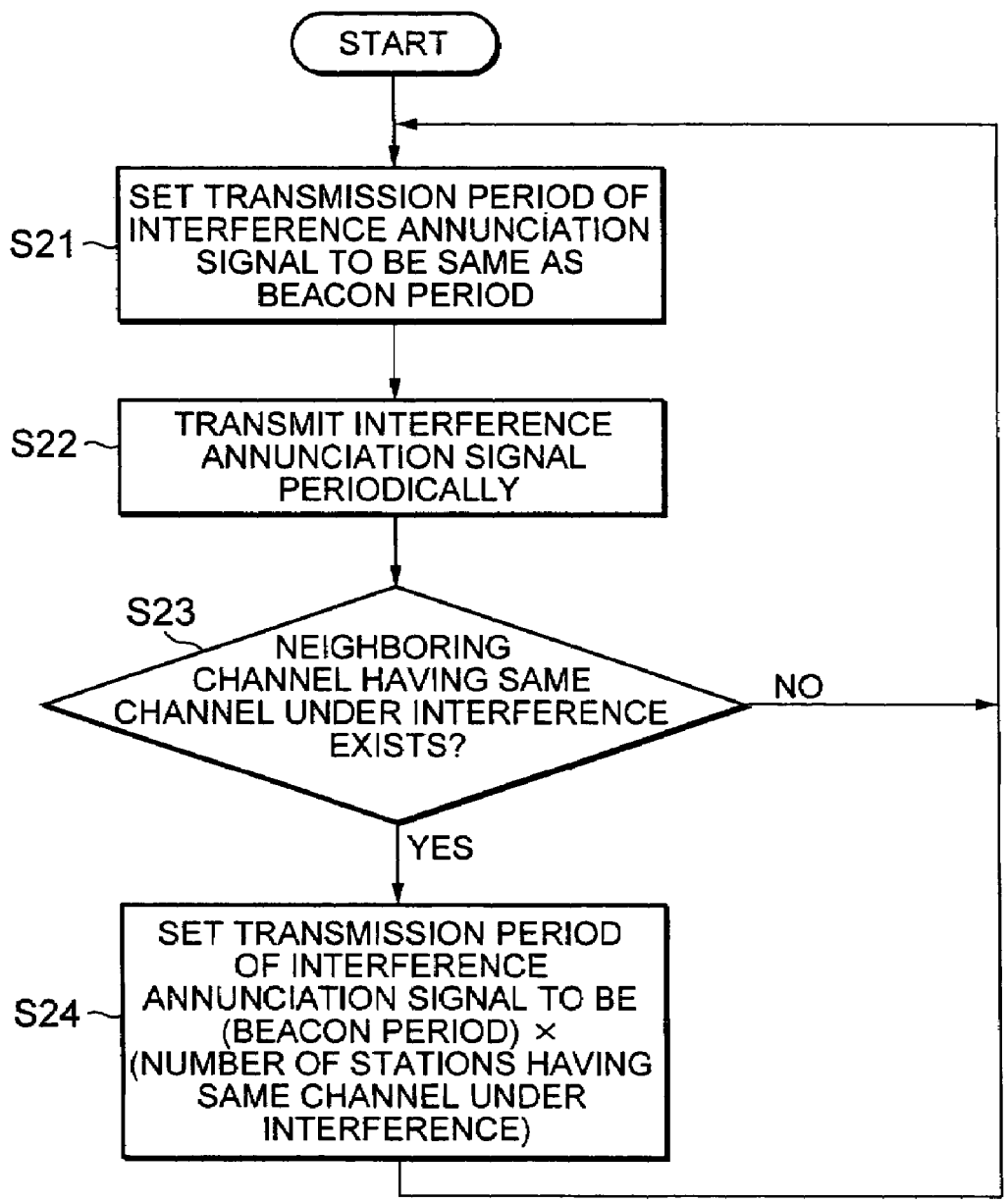
FIG. 21 is a flowchart showing a processing procedure of a communication station for setting the transmission frequency of the interference annunciation signals to be T_SF×(n+1) (where n indicates the number of the communication stations having the same channel under interference).

In the example described above, when it is supposed that the number of the neighbor terminals having interference in the same channel is n, the transmission frequency of the interference annunciation signals is set to be T_SF×(n+1). FIG. 21 shows the transmission operation of such interference annunciation signals IAS in the form of a flowchart. Such an operation procedure is actually implemented in the form in which the central control unit 103 in the wireless communication apparatus executes an execution command program stored in the information storage unit 113.

First, an interference annunciation signal transmission interval (IAS interval) for transmitting an interference annunciation signal IAS informing an interference channel is set to be same as the beacon period T_SF (step S21).

Next, the communication station periodically transmits the interference annunciation signals IAS at a predetermined interference annunciation signal transmission interval (step S22).

Now, the communication station judges whether or not there is any neighbor stations under interference in the same channel as one of the local station on the basis of, for example, the interference annunciation signals IAS received from a neighbor station (step S23).

When there are no neighbor stations having the same channel under interference, the operation of the communication station returns to the step S22 as it is, and the communication station periodically performs the transmission operation of the interference annunciation signal IAS at the same interference annunciation signal transmission interval as one used until now.

On the other hand, when there are n neighbor stations having the same channel under interference, the communication station sets its interference annunciation signal transmission interval to be same as the beacon period T_SF×(n+1) (step S24). Then, the operation of the communication station returns to the step S22, and the communication station periodically performs the transmission operation of the interference annunciation signal IAS at an interval longer than one used until now.

C-2. Transmission Frequency of Interference Annunciation Signals According to Entering of New Communication Station A case where a new terminal enters from another network in the wireless communication environment described in the C-1 above is considered.

In this case, even in a case where many terminals having the same interference exist, and, for example, a communication station transmits interference annunciation signals IAS at the interval of T_SF×3, it is arranged so that the communication station temporarily transmits the interference annunciation signals IAS at a relatively short interval of T_SF for a little while. Moreover, at the same time, the communication station transmits a packet informing a neighbor station of the existence of a new entry terminal. Also the neighbor station received the packet similarly sets the transmission interval of interference annunciation signals IAS to be T_SF for a little while, and increases its transmission frequency.

When a new entry communication station from another network appears, there is the possibility that a phenomenon in which the networks themselves overlap each other has occurred. In such a case, it is expected that a further new entry communication station appears. Accordingly, by adopting the above-mentioned construction, the transmission frequency of the interference annunciation signals is temporarily increased to make the possibility of the finding of the interference annunciation signals by the new entry station higher, and thereby the discovery of the new terminal is precipitated.

Figure 22:
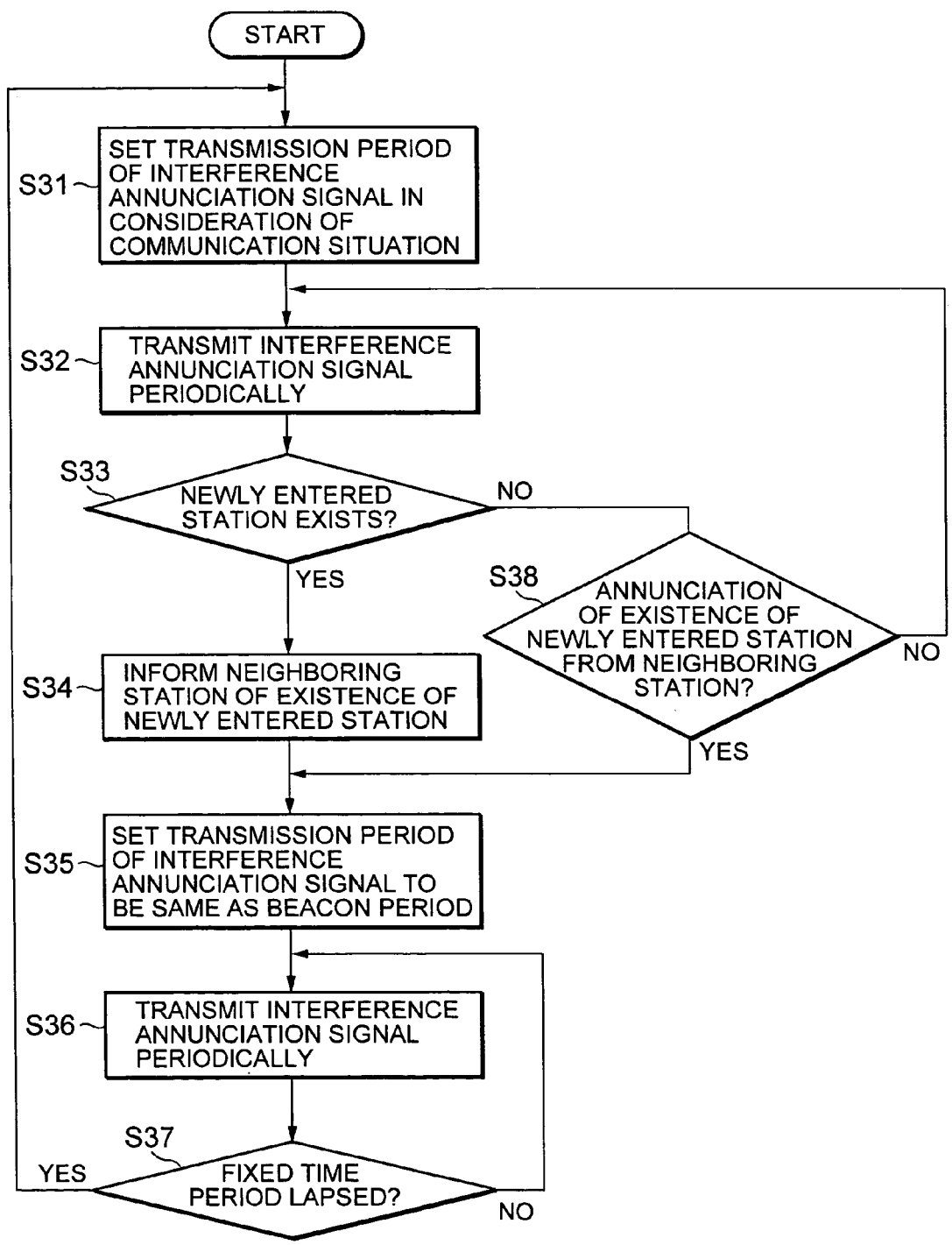
FIG. 22 is a flowchart showing an operation procedure of a communication station for temporarily increasing the transmission frequency of interference annunciation signals IAS in response to a discovery of a new entry station.

FIG. 22 shows an operation procedure of a communication station for temporarily increasing the transmission frequency of interference annunciation signals IAS in response to the discovery of a new entry station in the form of a flowchart. Such an operation procedure is actually implemented in the form in which the central control unit 103 in the wireless communication apparatus executes an execution command program stored in the information storage unit 113.

The communication station first considers the present communication environment to set the transmission period of the interference annunciation signal IAS (step S31).

Then, the communication station periodically transmits the interference annunciation signal IAS at a predetermined interference annunciation signal transmission interval (step S32).

Now, the communication station judges whether or not the communication station has discovered a new entry station (step S33). In a case where the communication station has discovered the new entry station, the communication station informs a neighbor station of the existence of the new entry station (step S34).

When the local station discovers the new entry station, or when the communication station recognizes the existence of the new entry station on the basis of information from a neighbor station, the communication station sets the interference annunciation signal transmission interval to be same as the beacon period T_SF for increasing the transmission frequency of the interference annunciation signals IAS to make the possibility of the new entry station's discovery higher (step S35). Then, the communication station periodically transmits the interference annunciation signal IAS at the set interference annunciation signal transmission interval (step S36).

Then, when a predetermined time has elapsed since the setting of the transmission interval of the interference annunciation signal IAS to be the beacon period (step S37), the operation of the communication station returns to the step S31, and the communication station considers the present communication environment to set the transmission period of the interference annunciation signal IAS.

Moreover, also in a case where the communication station does not discover any new entry stations at the step S33, the communication station judges whether or not the existence of the new entry station has been informed from a neighbor station (step S38). When both of the local station and the neighbor station do not discover the existence of any new entry stations, the operation of the communication station returns to the step S32 as it is, and the communication station periodically performs the transmission operation of the interference annunciation signal IAS at the interference annunciation signal transmission interval same as one used until now.

C-3. Transmission Frequency of Interference Annunciation Signals According to Elapsed Time of New Entering of Communication Station In a case where a terminal newly enters from another network under the wireless communication environment as described in the C-1 above, the communication terminal temporarily increases the transmission frequency of the interference annunciation signal IAS to make the possibility of the finding of the interference annunciation signals by the new entry station higher for precipitating the discovery of the new terminal (as mentioned above). On the other hand, when a predetermined time has elapsed since the new entering of a communication station, the possibility that the interference annunciation signals IAS have been already discovered becomes higher. Consequently, the necessity of setting the transmission frequency to be high is gradually being decreased. On the other hand, if the transmission frequency is kept to be high, it becomes a main factor of decreasing the availability of the channel.

Accordingly, in the present embodiment, the amount of time until a new terminal moves from another network is counted. When the counted value reaches a predetermined number, the transmission frequency of the interference annunciation signals IAS is decreased in turn. Hereupon, it is determined that, when the counted value reaches a predetermined number, the period of transmission is made longer by the T_SF.

Such control of the transmission frequency of the interference annunciation signal IAS would make the transmission frequency of the interference annunciation signal IAS decrease gradually until the appearance of the next new entry station. As a result, because the transmission frequency of the interference annunciation signal IAS becomes smaller according to the degree of the unnecessariness of the interference annunciation signal IAS, the transmission of useless packet informing interference is going to be removed.

After that, when a communication station which newly enters the network appears again, the communication station returns the transmission frequency of the interference annunciation signal IAS to the initial value, and endeavors to obtain early discovery.

Figure 23:
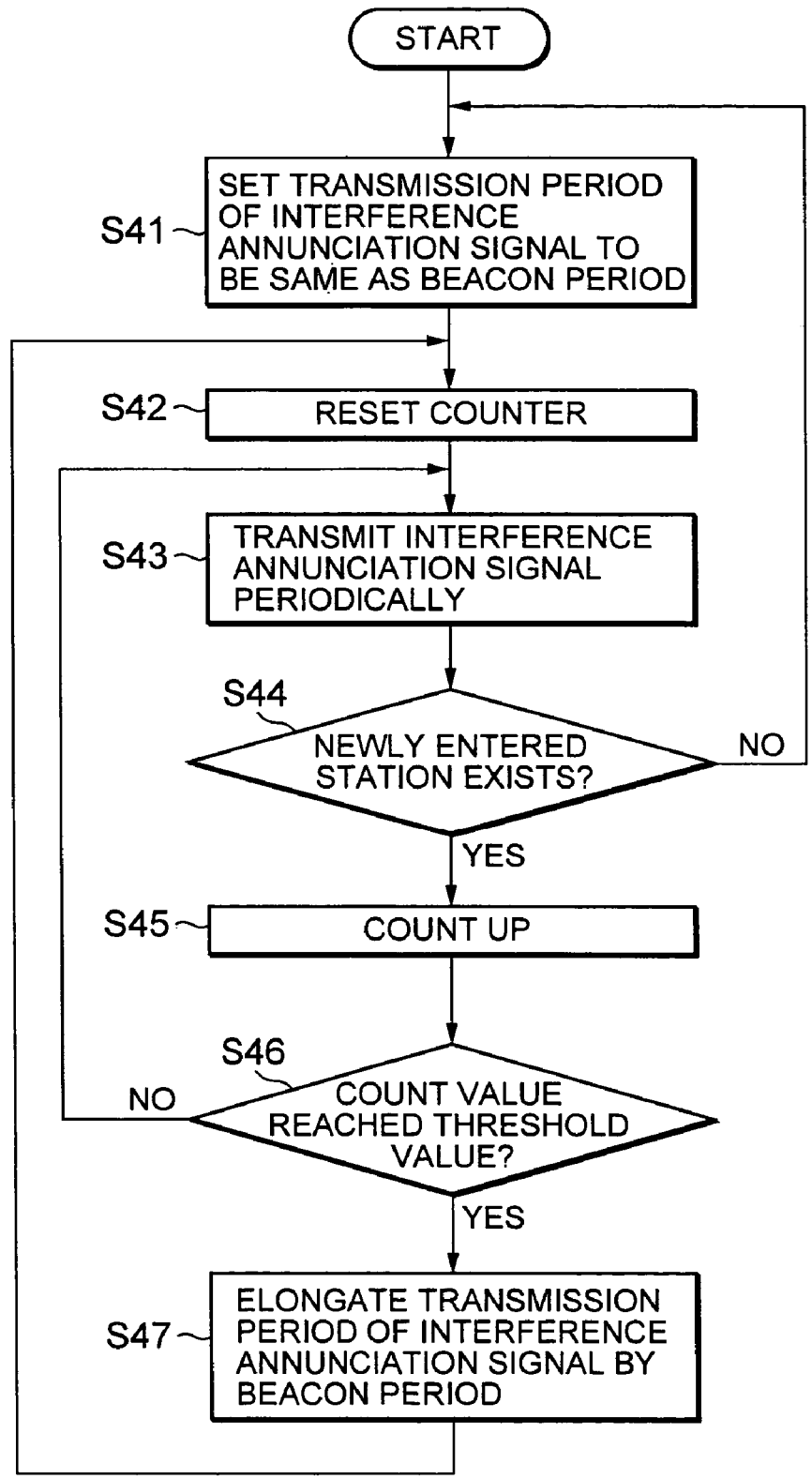
FIG. 23 is a flowchart showing an operation procedure of a communication station for controlling the transmission frequency of interference annunciation signals IAS according to elapsed time from the discovery of the new entry station.

FIG. 23 shows an operation procedure of a communication station for controlling the transmission frequency of interference annunciation signals IAS according to the elapsed time since the discovery of a new entry station in the form of a flowchart. Such an operation procedure is actually implemented in the form in which the central control unit 103 in the wireless communication apparatus executes an execution command program stored in the information storage unit 113.

The communication station first sets the transmission period of the interference annunciation signals IAS to be same as the beacon transmission period T_SF (step S41), and resets the counter value (step S42).

Then, the communication station periodically transmits the interference annunciation signals IAS at a predetermined interference annunciation signal transmission interval (step S43).

Hereupon, the communication station judges whether or not a new entry station is discovered (step S44). When the communication station does not discover any new entry stations, the operation of the communication station returns to the step S41 as it is, and the communication station periodically performs the transmission operation of the interference annunciation signal IAS at an interference annunciation signal transmission interval, which is under consideration of the present communication environment.

On the other hand, when the communication station discovers a new entry station, the communication station performs an increment of the counter value (step S45).

Incidentally, the discovery of the new entry station may include the information from neighbor stations similarly to the case shown in FIG. 22 in addition to a case of the discovery by the local station.

Until the counter value reaches a predetermined value (step S46), the communication station returns to the step S43, and repeatedly executes the periodical transmission operation of the interference annunciation signal IAS.

Then, when the counter value reaches the predetermined value, the communication station makes the transmission period of the interference annunciation signals IAS by the beacon transmission period T_SF longer (step S47), and returns to the step S42.

The present invention has been described in detail with reference to particular embodiments. However, it is obvious that the person skilled in the art can make modifications and alternatives of the embodiments without departing from the gist of the present invention. Namely, the present invention has been disclosed illustratively, and the contents described in the specification should not be construed limitedly. In order to judge the gist of the present invention, Claims described below should be considered.

What is claimed is:

1. A wireless communication system for forming a network based on ad hoc communication by a plurality of wireless communication stations without arranging a control station in a communication environment provided with a plurality of channels, each of said plurality of wireless communication stations comprising:
   a beacon transmission unit configured to transmit a beacon at a predetermined beacon period through its own beacon transmission channel; and an interference annunciation signal transmitting unit configured to transmit an interference annunciation signal describing information related to a channel under interference of a local station through another usable channel at a predetermined period.

2. The wireless communication system according to claim 1, wherein each of said communication stations further comprises:
a channel scanner configured to perform a channel scanning operation of each channel at a period which does not synchronize with a transmission period of the interference annunciation signal.

3. The wireless communication system according to claim 1, wherein each of said communication stations further comprises:
a comparator configured to compare interference information of each channel of a neighbor station, the information described in the interference annunciation signal received from the neighbor station with a beacon transmission channel of the local station; and
a channel changer configured to change the beacon transmission channel of the local station to a channel through which the neighbor station can easily listen to the beacon of the local station when it becomes clear that the beacon is transmitted through a channel on which an interference level is high.

4. A wireless communication apparatus operating in a self-organized distributed manner in a wireless communication environment, said apparatus comprising:
interference annunciation signal generation means for generating a beacon signal indicating a channel currently being used for transmission by a local station and an interference annunciation signal indicating interference levels received by the local station on a plurality of channels;
communication means for transmitting and receiving wireless data through each channel;
interference annunciation signal analysis means for analyzing the beacon signal and the interference annunciation signal of a neighbor station, the signals received by said communication means;
channel setting means for setting data transmission and reception channel in said communication means; and
communication control means for controlling a transmission operation of the beacon signals and the interference annunciation signals of the local station in said communication means, and a reception operation of the beacon signals and the interference annunciation signals from said neighbor station.

5. The wireless communication apparatus according to claim 4, wherein said channel setting means determines its own beacon transmission channel among the plurality of channels, and sets a channel other than the beacon transmission channel as a transmission channel of the interference annunciation signal.

6. The wireless communication apparatus according to claim 5, wherein said channel setting means excludes a channel under interference of the local station from the beacon transmission channel and the transmission channel of the interference annunciation signal.

7. The wireless communication apparatus according to claim 4, wherein said communication control means controls a channel scanning operation of each channel at a period which does not synchronize with a transmission period of the interference annunciation signals.

8. The wireless communication apparatus according to claim 4, wherein said interference annunciation signal analysis means compares interference information of each channel of the neighbor station, the information described in the interference annunciation signal received from the neighbor station, with a beacon transmission channel of the local station, and said channel setting means changes a beacon transmission channel of the local station to a channel through which the neighbor station can easily listen to the beacon when it becomes clear that the beacon is transmitted through a channel on which an interference level of the neighbor station is high on a basis of a result of the comparison.

9. The wireless communication apparatus according to claim 4, wherein, in a case where there are no channels under interference of the local station, said communication control means does not transmit the interference annunciation signal, or said interference annunciation signal generation means does not generate the interference annunciation signal.

10. The wireless communication apparatus according to claim 4, wherein, when it becomes clear that there are neighbor stations having a same channel under interference as a result of an analysis by said interference annunciation signal analysis means, said communication control means adjusts a transmission frequency of the interference annunciation signal according to a number of said neighbor stations to transmit the interference annunciation signal.

11. The wireless communication apparatus according to claim 4, wherein said communication control means increases a transmission frequency of the interference annunciation signals for a predetermined time period in response to entering of a new communication station.

12. The wireless communication apparatus according to claim 11, further comprising:
means for informing the neighbor station of entering of a new communication station when the entering is discovered,
wherein said communication control means increases the transmission frequency of the interference annunciation signal for the predetermined time period in response to information indicating the entering of said new communication station.

13. The wireless communication apparatus according to claim 11, wherein said communication control means gradually decreases the transmission frequency of the interference annunciation signal from an initial value according to elapsed time from the entering of the new communication station.

14. A wireless communication method operating in a self-organized distributed manner in a wireless communication environment, said method comprising:
generating a beacon signal indicating a channel currently being used for transmission by a local station and an interference annunciation signal indicating interference levels received by the local station on a plurality of channels;
analyzing the beacon signal and the interference annunciation signal, both received from a neighbor station;
setting a data transmission and reception channel; and
controlling a transmission operation of the beacon signals and the interference annunciation signals of the local station, and a reception operation of the beacon signals and the interference annunciation signal from the neighbor station.

15. The wireless communication method according to claim 14, wherein said setting includes determining an own beacon transmission channel among the plurality of channels, and a channel other than the beacon transmission channel is set as a transmission channel of the interference annunciation signal.

16. The wireless communication method according to claim 15, wherein said setting, includes excluding the channel under the interference of the local station from the beacon transmission channel and the transmission channel of the interference annunciation signal.

17. The wireless communication method according to claim 14, wherein said controlling includes controlling a channel scanning operation of each channel at a period which does not synchronize with a transmission period of the interference annunciation signals.

18. The wireless communication method according to claim 14, wherein said analyzing includes comparing interference information of each channel of the neighbor station, the information described in the interference annunciation signal received from the neighbor station, with a beacon transmission channel of the local station, and
said setting includes changing a beacon transmission channel of the local station to a channel through which the neighbor station can easily listen to the beacons when it becomes clear that the beacons are transmitted through a channel on which an interference level of the neighbor station is high on a basis of a result of the comparing.

19. The wireless communication method according to claim 14, wherein, in a case where there are no channels under interference of the local station, said controlling includes not transmitting the interference annunciation signal, or said generating includes not generating the interference annunciation signal.

20. The wireless communication method according to claim 14, wherein said controlling includes adjusting a transmission frequency of the interference annunciation signal according to a number of the neighbor stations to transmit the interference annunciation signal when the analyzing shows that a neighbor station has a same channel under interference.

21. The wireless communication method according to claim 14, wherein said controlling includes increasing a transmission frequency of the interference annunciation signals for a predetermined time period in response to entering of a new communication station.

22. The wireless communication method according to claim 21, further comprising:
informing the neighbor station of the entering of the new communication station when the entering is discovered,
wherein said controlling includes increasing the transmission frequency of the interference annunciation signal for the predetermined time period in response to information indicating the entering of the new communication station.

23. The wireless communication method according to claim 21, wherein said controlling includes gradually decreasing the transmission frequency of the interference annunciation signal from an initial value according to elapsed time from the entering of the new communication station.

24. A computer readable medium including computer executable instructions, wherein the instructions, when executed by a processor, cause the processor to perform a method comprising:
generating a beacon signal indicating a channel currently being used for transmission by a local station and an interference annunciation signal indicating interference levels received by the local station on a plurality of channels;
analyzing the beacon signal and the interference annunciation signal, both received from a neighbor station;
setting a data transmission and reception channel; and
controlling a transmission operation of the beacon signal and the interference annunciation signal of the local station, and a reception operation of the beacon signal and the interference annunciation signal from the neighbor station.

25. A wireless communication apparatus operating in a self-organized distributed manner in a wireless communication environment, said apparatus comprising:
an interference annunciation signal generation unit configured to generate a beacon signal indicating a channel currently being used for transmission by a local station and an interference annunciation signal indicating interference levels received by the local station on a plurality of channels;
a communication unit configured to transmit and receive wireless data through each channel;
an interference annunciation signal analysis unit configured to analyze the beacon signal and the interference annunciation signal of a neighbor station, the signals received by said communication unit;
a channel setting unit configured to set data transmission and reception channel in said communication unit; and
a communication control unit configured to control a transmission operation of the beacon signals and the interference annunciation signals of the local station in said communication unit, and a reception operation of the beacon signals and the interference annunciation signals from said neighbor station.

* * * * *